US012272350B2

(12) United States Patent
Trueba et al.

(10) Patent No.: US 12,272,350 B2
(45) Date of Patent: *Apr. 8, 2025

(54) TEXT-TO-SPEECH (TTS) PROCESSING

(71) Applicant: Amazon Technologies, Inc., Seattle, WA (US)

(72) Inventors: Jaime Lorenzo Trueba, Cambridge (GB); Thomas Renaud Drugman, Carnieres (BE); Viacheslav Klimkov, Gdansk (PL); Srikanth Ronanki, Cambridge (GB); Thomas Edward Merritt, Cambridge (GB); Andrew Paul Breen, Norwich (GB); Roberto Barra-Chicote, Cambridge (GB)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/664,461

(22) Filed: May 15, 2024

(65) Prior Publication Data

US 2024/0296827 A1 Sep. 5, 2024

Related U.S. Application Data

(63) Continuation of application No. 18/206,301, filed on Jun. 6, 2023, now Pat. No. 11,990,118, which is a continuation of application No. 17/882,691, filed on Aug. 8, 2022, now Pat. No. 11,735,162, which is a continuation of application No. 16/922,590, filed on Jul. 7, 2020, now Pat. No. 11,410,639, which is a continuation of application No. 16/141,241, filed on Sep. 25, 2018, now Pat. No. 10,741,169.

(51) Int. Cl.
*G10L 13/10* (2013.01)
*G10L 13/06* (2013.01)
*G10L 25/18* (2013.01)

(52) U.S. Cl.
CPC .............. *G10L 13/10* (2013.01); *G10L 13/06* (2013.01); *G10L 25/18* (2013.01)

(58) Field of Classification Search
CPC ......... G10L 13/10; G10L 13/06; G10L 25/18; G10L 13/027; G10L 13/08; G10L 13/02
See application file for complete search history.

(56) References Cited

U.S. PATENT DOCUMENTS 8,005,677 B2 * 8/2011 Cutaia .................. G10L 13/033 704/260
2007/0055527 A1 * 3/2007 Jeong .................... G10L 13/033 704/260
2016/0112475 A1 * 4/2016 Lawson ................ H04M 15/62 709/204
2019/0325896 A1 * 10/2019 Bromand ................ G10L 15/22

* cited by examiner

*Primary Examiner* — Huyen X Vo
(74) *Attorney, Agent, or Firm* — Pierce Atwood LLP

(57) ABSTRACT

During text-to-speech processing, a speech model creates output audio data, including speech, that corresponds to input text data that includes a representation of the speech. A spectrogram estimator estimates a frequency spectrogram of the speech; the corresponding frequency-spectrogram data is used to condition the speech model. A plurality of acoustic features corresponding to different segments of the input text data, such as phonemes, syllable-level features, and/or word-level features, may be separately encoded into context vectors; the spectrogram estimator uses these separate context vectors to create the frequency spectrogram.

20 Claims, 21 Drawing Sheets

TEXT-TO-SPEECH (TTS) PROCESSING

CROSS-REFERENCE TO RELATED APPLICATION

This application is a continuation of, and claims priority to, U.S. patent application Ser. No. 18/206,301, entitled "TEXT-TO-SPEECH (TTS) PROCESSING", filed on Jun. 6, 2023 and scheduled to issue as U.S. Pat. No. 11,990,118, which is a continuation of, and claims priority to, U.S. patent application Ser. No. 17/882,691, entitled "TEXT-TO-SPEECH (TTS) PROCESSING", filed on Aug. 8, 2022, now issued U.S. Pat. No. 11,735,162, which is a continuation of, and claims priority to, U.S. patent application Ser. No. 16/922,590, entitled "TEXT-TO-SPEECH (TTS) PROCESSING," filed on Jul. 7, 2020, now issued U.S. Pat. No. 11,410,639, which is a continuation of, and claims priority to, U.S. patent application Ser. No. 16/141,241, entitled "TEXT-TO-SPEECH (TTS) PROCESSING," filed on Sep. 25, 2018, and issued as U.S. Pat. No. 10,741,169. The above applications are hereby incorporated by reference in their entirety.

BACKGROUND

Text-to-speech (TTS) systems convert written text into sound. This conversion may be useful to assist users of digital text media by synthesizing speech representing text displayed on a computer screen. Speech-recognition systems have progressed to a point at which humans may interact with and control computing devices by voice. TTS and speech recognition, combined with natural language understanding processing techniques, enable speech-based user control and output of a computing device to perform tasks based on the user's spoken commands. The combination of speech recognition and natural-language understanding processing is referred to herein as speech processing. TTS and speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
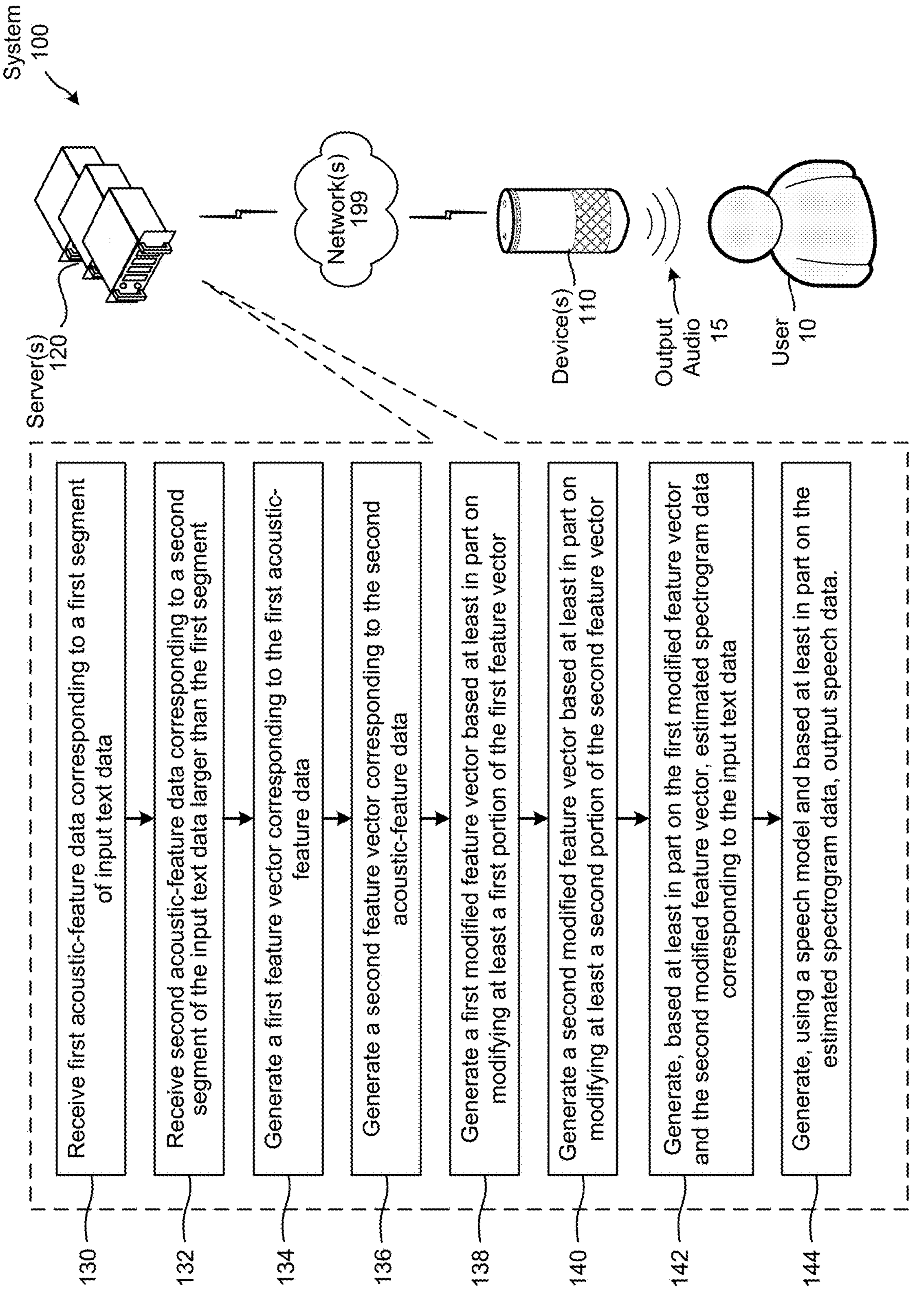
FIG. 1 illustrates an exemplary system overview according to embodiments of the present disclosure.

Text-to-speech (TTS) systems may employ one of two techniques, each of which is described in more detail below. A first technique, called unit selection or concatenative TTS, processes and divides pre-recorded speech into many different segments of audio data, which may be referred to as units or speech units. The pre-recorded speech may be obtained by recording a human speaking many lines of text. Each segment that the speech is divided into may correspond to a particular acoustic unit such as a phone, phoneme, diphone, triphone, senon, or other acoustic unit. The individual acoustic units and data describing the units may be stored in a unit database, which may also be called a voice corpus or voice inventory. When text data is received for TTS processing, the system may select acoustic units that correspond to the text data and may combine them to generate audio data that represents synthesized speech of the words in the text data.

A second technique, called parametric synthesis or statistical parametric speech synthesis (SPSS), may use computer models and other data processing techniques to generate sound—that is not based on pre-recorded speech (e.g., speech recorded prior to receipt of an incoming TTS request)—but rather uses computing parameters to create output audio data. Vocoders are examples of components that can produce speech using parametric synthesis. Parametric synthesis may provide a large range of diverse sounds that may be computer-generated at runtime for a TTS request.

Each of these techniques, however, suffer from drawbacks. Regarding unit selection, it may take many hours of recorded speech to create a sufficient voice inventory for eventual unit selection. Further, in order to have output speech having desired audio qualities, the human speaker used to record the speech may be required to speak using a desired audio quality, which may be time consuming. For example, if the system is to be configured to be able to synthesize whispered speech using unit selection, a human user may need to read text in a whisper for hours to record enough sample speech to create a unit selection voice inventory that can be used to synthesized whispered speech. The same is true for speech with other qualities such as stern speech, excited speech, happy speech, etc. Thus, a typical voice inventory includes only neutral speech or speech that does not typically include extreme emotive or other nonstandard audio characteristics. Further, a particular voice inventory may be recorded by a particular voice actor fitting a certain voice profile and in a certain language, e.g., male Australian English, female Japanese, etc. Configuring individual voice inventories for many combinations of language, voice profiles, audio qualities, etc., may be prohibitive.

Parametric synthesis, while typically more flexible at runtime, may not create natural sounding output speech when compared to unit selection. While a model may be trained to predict, based on input text, speech parameters—i.e., features that describe a speech waveform to be created based on the speech parameters—parametric systems still require that manually crafted assumptions be used to create the vocoders, which lead to a reduction in generated speech quality. Hybrid synthesis, which combines aspects of unit selection and parametric synthesis, may, however, still lead to less natural sounding output than custom-tailored unit selection due to reliance on parametric synthesis when no appropriate unit may be suitable for given input text.

To address these deficiencies, a model may be trained to directly generate audio output waveforms sample-by-sample. The model may be trained to generate audio output that resembles the style, tone, language, or other vocal attribute of a particular speaker using training data from one or more human speakers. The model may create tens of thousands of samples per second of audio; in some embodiments, the rate of output audio samples is 16 kilohertz (kHz). The model may be fully probabilistic and/or autoregressive; the predictive distribution of each audio sample may be conditioned on all previous audio samples. As explained in further detail below, the model may use causal convolutions to predict output audio; in some embodiments, the model uses dilated convolutions to generate an output sample using a greater area of input samples than would otherwise be possible. The model may be trained using a conditioning network that conditions hidden layers of the network using linguistic context features, such as phoneme data. The audio output generated by the model may have higher audio quality than either unit selection or parametric synthesis.

This type of direct generation of audio waveforms using a trained model may be, however, computationally expensive, and it may be difficult or impractical to produce an audio waveform quickly enough to provide real-time responses to incoming text, audio, or other such queries. A user attempting to interact with a system employing such a trained model may experience unacceptably long delays between the end of a user query and the beginning of a system response. The delays may cause frustration to the user or may even render the system unusable if real-time responses are required (such as systems that provide driving directions, for example).

The present disclosure recites systems and methods for synthesizing speech from text. In various embodiments, a spectrogram estimator estimates a spectrogram corresponding to input text data using, as explained in greater detail below, a sequence-to-sequence (seq2seq) model. The seq2seq model may include a plurality of encoders; each encoder may receive one of a plurality of different types of acoustic data, such as, for example, a first encoder that receives phonemes corresponding to input text data, a second encoder that receives syllable-level features corresponding to the input text data, a third encoder that receives word-level features corresponding to the input text data, and additional encoders that receive additional features, such as emotion, speaker, accent, language, or other features.

The different types of acoustic-feature data may correspond to different-sized segments of the input text data; i.e., the features may have different time resolutions. For example, a first type of acoustic data may have a first, smallest segment size and may correspond to acoustic units, such as phonemes; i.e., this first segment type may have a finest resolution. A second type of acoustic data may have a second, larger segment size and may correspond to syllables, such as syllable-level features; i.e., this second segment type may have a greater resolution than the first type of acoustic data. A third type of acoustic data may have a third, still larger segment size and may correspond to words, such as word-level features; i.e., this third segment type may have a resolution greater than that of both the first type and the second type. Other types of acoustic data, such as acoustic features relating to emotion, speaker, accent or other features may have varying segments sizes and correspondingly varying resolutions. The first, second, and/or third types of acoustic data may correspond to segments of the input text data and may be referred to as representing segmental prosody; the second, third, and other types of acoustic data may correspond to more than one segment of acoustic data and may be referred to as representing supra-segmental prosody.

A decoder may receive the outputs of the encoders; the outputs may represent encodings of the various features as represented by numbers or vectors of numbers. The decoder may output a spectrogram corresponding to the input text data; the spectrogram may be a representation of frequencies of sound (i.e., speech) corresponding to the text data, which may vary in accordance with the prosody and/or intonation of the output speech. A speech model may use the spectrogram data, in addition to the input text data, to synthesize speech.

An exemplary system overview is described in reference to FIG. 1. As shown in FIG. 1, a system 100 may include one or more server(s) 120 connected over a network 199 to one or more device(s) 110 that are local to a user 10. The server(s) 120 may be one physical machine capable of performing various operations described herein or may include several different machines, such as in a distributed computing environment, that combine to perform the operations described herein. The server(s) 120 and/or device(s) 110 may produce output audio 15 in accordance with the embodiments described herein. The server(s) 120 receives (130) first acoustic-feature data corresponding to a first segment of input text data. The server(s) 120 receives (132) second acoustic-feature data corresponding to a second segment of the input text data larger than the first segment of input text data. For example, the first acoustic-feature data be a phoneme and may correspond to a word or part of a word of the input text data; the second acoustic-feature data may by a group of phonemes and may correspond to a word or sentence of the input text data. The server(s) 120 generates (134) a first feature vector corresponding to the first acoustic-feature data. The server(s) 120 generates (136) a second feature vector corresponding to the second acoustic-feature data. The server(s) 120 generates (138) a first modified feature vector based at least in part on modifying at least a first portion of the first feature vector. The server(s) 120 generates (140) a second modified feature vector based at least in part on modifying at least a second portion of the second feature vector. The server(s) 120 generates, (142) based at least in part on the first weighted feature vector and the second weighted feature vector, estimated spectrogram data corresponding to the input text data. The server(s) 120 generates, (144) using a speech model and based at least in part on the estimated spectrogram data, output speech data.

Figure 2:
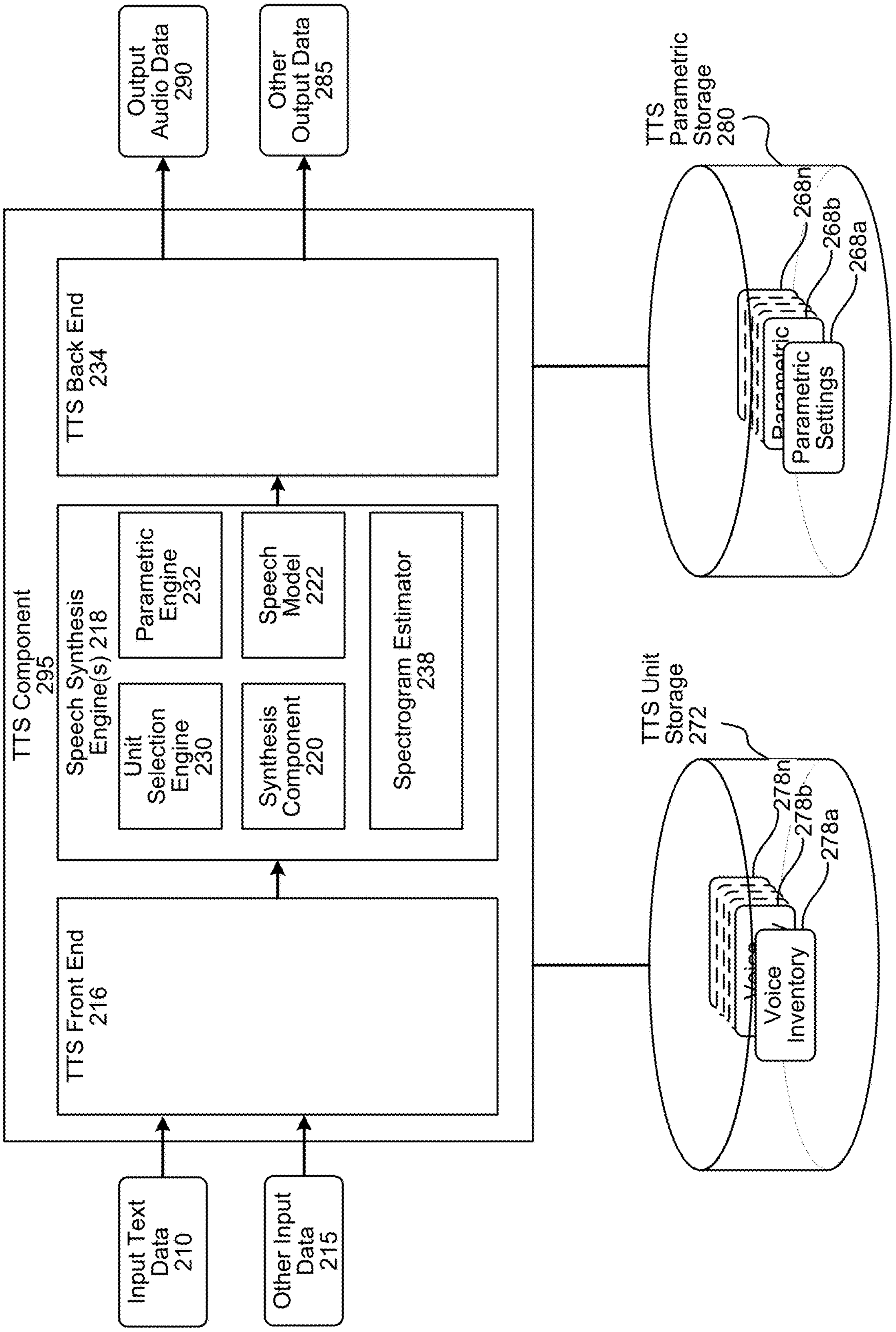
FIG. 2 illustrates components for performing text-to-speech (TTS) processing according to embodiments of the present disclosure.

Components of a system that may be used to perform unit selection, parametric TTS processing, and/or model-based audio synthesis are shown in FIG. 2. In various embodiments of the present invention, model-based synthesis of audio data may be performed using by a speech model 222 and a TTS front-end 216. The TTS front-end 216 may be the same as front ends used in traditional unit selection or parametric systems. In other embodiments, some or all of the components of the TTS front end 216 are based on other trained models. The present invention is not, however, limited to any particular type of TS front end 216.

As shown in FIG. 2, the TTS component/processor 295 may include a TTS front end 216, a speech synthesis engine 218, TTS unit storage 272, and TTS parametric storage 280. The TS unit storage 272 may include, among other things, voice inventories 278*a*-288*n* that may include pre-recorded audio segments (called units) to be used by the unit selection engine 230 when performing unit selection synthesis as described below. The TS parametric storage 280 may include, among other things, parametric settings 268*a*-268*n* that may be used by the parametric synthesis engine 232 when performing parametric synthesis as described below. A particular set of parametric settings 268 may correspond to a particular voice profile (e.g., whispered speech, excited speech, etc.). The speech model 222 may be used to synthesize speech without requiring the TTS unit storage 272 or the TTS parametric storage 280, as described in greater detail below.

The TS front end 216 transforms input text data 210 (from, for example, an application, user, device, or other text source) into a symbolic linguistic representation, which may include linguistic context features such as phoneme data, punctuation data, syllable-level features, word-level features, and/or emotion, speaker, accent, or other features for processing by the speech synthesis engine 218. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the input text data 210, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 216 may also process other input data 215, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the input text data 210 and/or the text for a TTS request may be accompanied by separate metadata indicating what text should be whispered (or have some other indicated audio characteristic). The speech synthesis engine 218 may compare the annotated phonetic units models and information stored in the TTS unit storage 272 and/or TTS parametric storage 280 for converting the input text into speech. The TTS front end 216 and speech synthesis engine 218 may include their own controller(s)/processor(s) and memory or they may use the controller/processor and memory of the server 120, device 110, or other device, for example. Similarly, the instructions for operating the TS front end 216 and speech synthesis engine 218 may be located within the TTS component 295, within the memory and/or storage of the server 120, device 110, or within an external device.

Text data 210 input into the TTS component 295 may be sent to the TTS front end 216 for processing. The front-end may include components for performing text normalization, linguistic analysis, linguistic prosody generation, or other such components. During text normalization, the TTS front end 216 may first process the text input and generate standard text, converting such things as numbers, abbreviations (such as Apt., St., etc.), symbols ($, %, etc.) into the equivalent of written out words.

During linguistic analysis, the TS front end 216 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 295 may process speech based on phonemes (individual sounds), half-phonemes, diphones (the last half of one phoneme coupled with the first half of the adjacent phoneme), biphones (two consecutive phonemes), syllables, words, phrases, sentences, or other units. Each word may be mapped to one or more phonetic units. Such mapping may be performed using a language dictionary stored by the system, for example in the TS storage component 272. The linguistic analysis performed by the TS front end 216 may also identify different grammatical components such as prefixes, suffixes, phrases, punctuation, syntactic boundaries, or the like. Such grammatical components may be used by the TTS component 295 to craft a natural-sounding audio waveform output. The language dictionary may also include letter-to-sound rules and other tools that may be used to pronounce previously unidentified words or letter combinations that may be encountered by the TTS component 295. Generally, the more information included in the language dictionary, the higher quality the speech output.

Based on the linguistic analysis the TTS front end 216 may then perform linguistic prosody generation where the phonetic units are annotated with desired prosodic characteristics, also called acoustic features, which indicate how the desired phonetic units are to be pronounced in the eventual output speech. During this stage the TTS front end 216 may consider and incorporate any prosodic annotations that accompanied the text input to the TTS component 295. Such acoustic features may include syllable-level features, word-level features, emotion, speaker, accent, language, pitch, energy, duration, and the like. Application of acoustic features may be based on prosodic models available to the TTS component 295. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 216, which may be referred to as a symbolic linguistic representation, may include a sequence of phonetic units annotated with prosodic characteristics. This symbolic linguistic representation may be sent to the speech synthesis engine 218, which may also be known as a synthesizer, for conversion into an audio waveform of speech for output to an audio output device and eventually to a user. The speech synthesis engine 218 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 218 may perform speech synthesis using one or more different methods. In one method of synthesis called unit selection, described further below, a unit selection engine 230 matches the symbolic linguistic representation created by the TTS front end 216 against a database of recorded speech, such as a database (e.g., TTS unit storage 272) storing information regarding one or more voice corpuses (e.g., voice inventories 278*a-n*). Each voice inventory may correspond to various segments of audio that was recorded by a speaking human, such as a voice actor, where the segments are stored in an individual inventory 278 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 230 may then use the information about each unit to select units to be joined together to form the speech output.

The unit selection engine 230 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 220) to form output audio data 290 representing synthesized speech. Using all the information in the unit database, a unit selection engine 230 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis called parametric synthesis parameters such as frequency, volume, noise, are varied by a parametric synthesis engine 232, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 220) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 295 may be configured to perform TTS processing in multiple languages. For each language, the TS component 295 may include specially configured data, instructions and/or components to synthesize speech in the desired language(s). To improve performance, the TTS component 295 may revise/update the contents of the TS storage 280 based on feedback of the results of TTS processing, thus enabling the TTS component 295 to improve speech recognition.

The TTS storage component 295 may be customized for an individual user based on his/her individualized desired speech output. In particular, the speech unit stored in a unit database may be taken from input audio data of the user speaking. For example, to create the customized speech output of the system, the system may be configured with multiple voice inventories 278*a*-278*n*, where each unit database is configured with a different "voice" to match desired speech qualities. Such voice inventories may also be linked to user accounts. The voice selected by the TTS component 295 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TS training utterances may then be split into small audio segments and stored as part of a voice corpus. The individual speaking the TS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 278 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 268) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 230 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 230. As part of unit selection, the unit selection engine 230 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 272 or in another storage component. For example, different unit selection databases may be stored in TTS unit storage 272. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 218 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output. An example of how unit selection is performed is illustrated in FIGS. 3A and 3B.

Figure 3A:
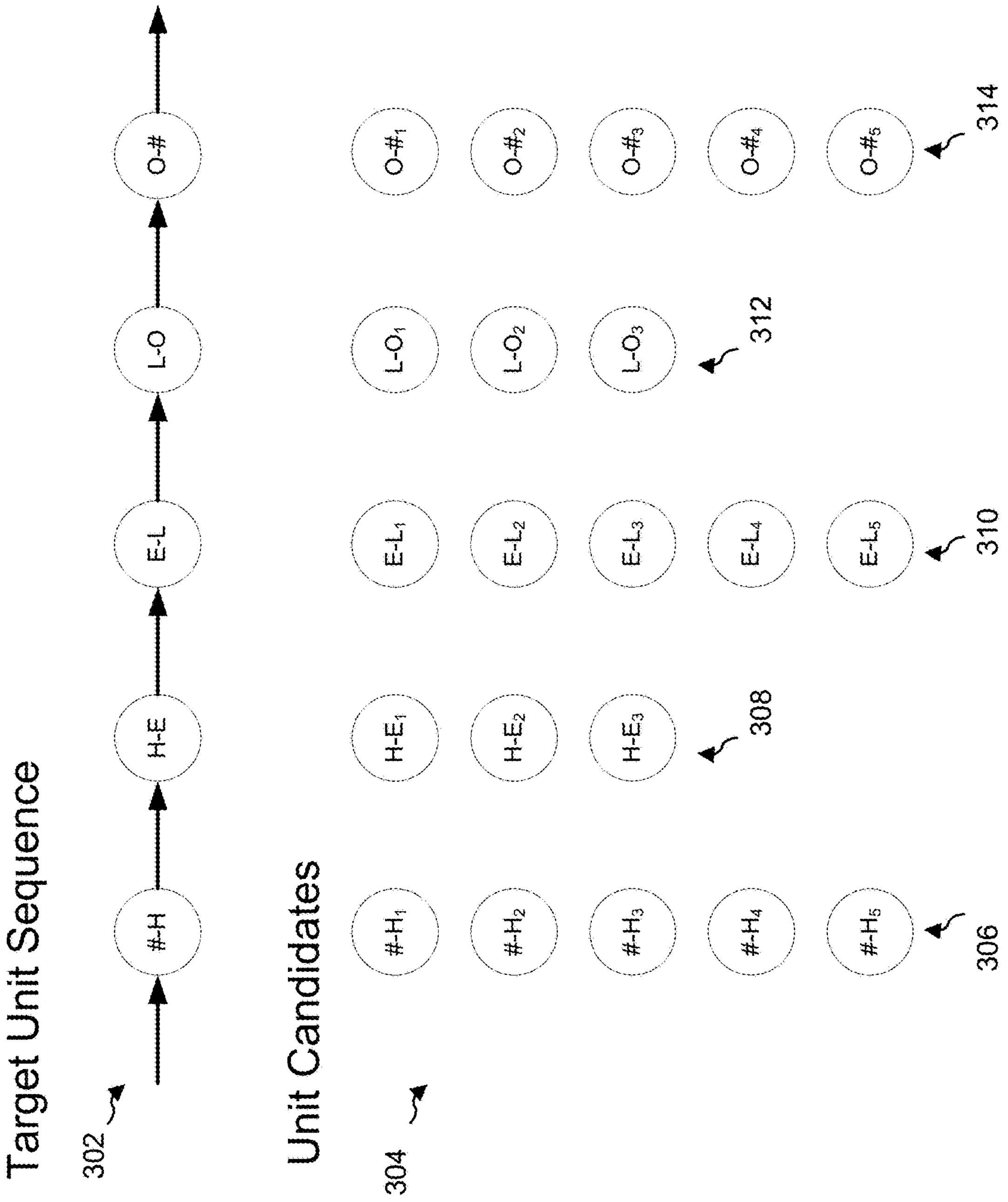
FIGS. 3A and 3B illustrate speech synthesis using unit selection according to embodiments of the present disclosure.
Figure 3B:
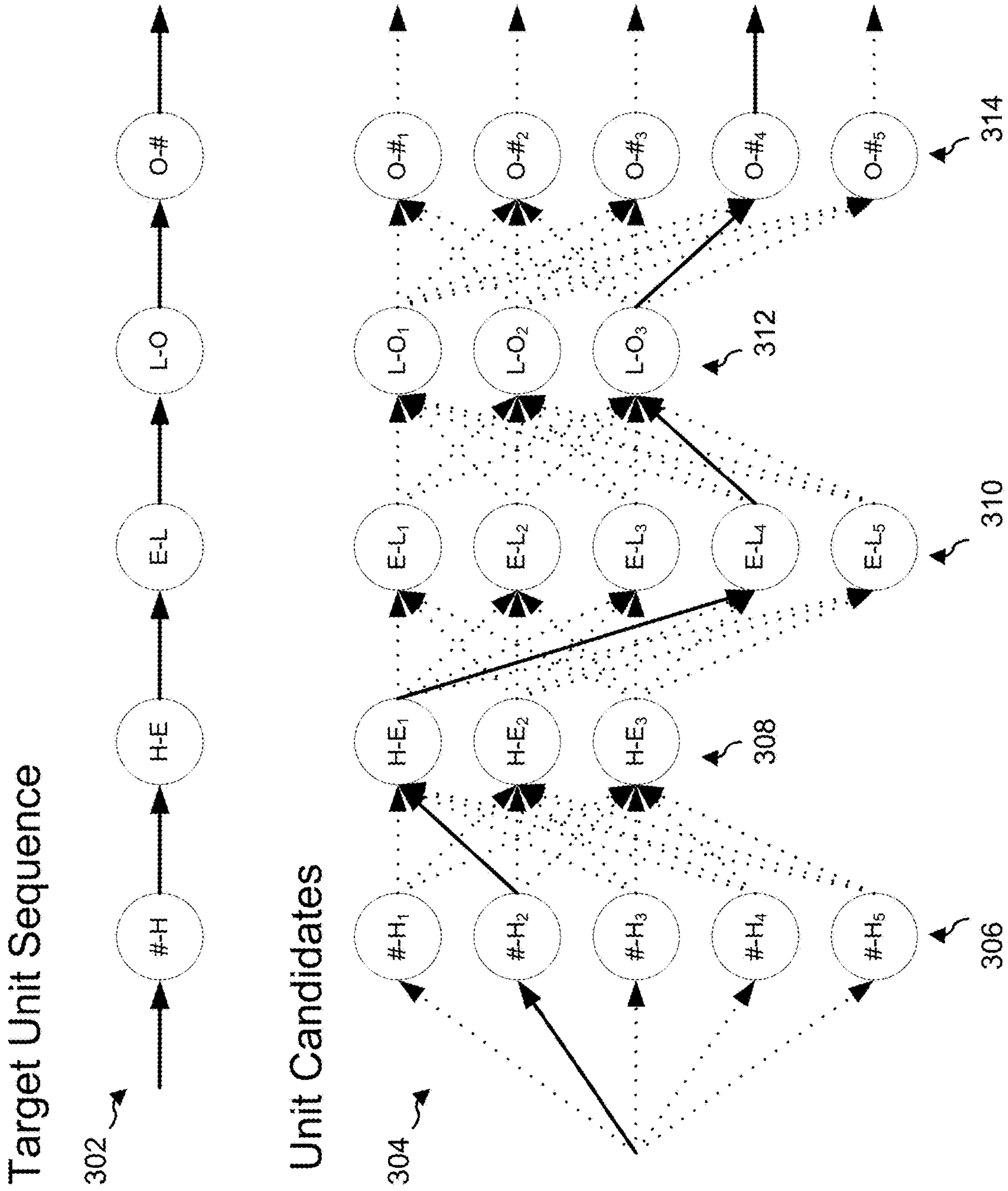

For example, as shown in FIG. 3A, a target sequence of phonetic units 310 to synthesize the word "hello" is determined by a TTS device. As illustrated, the phonetic units 310 are individual diphones, though other units, such as phonemes, etc. may be used. A number of candidate units may be stored in the voice corpus. For each phonetic unit indicated as a match for the text, there are a number of potential candidate units 304 (represented by columns 306, 308, 310, 312 and 314) available. Each candidate unit represents a particular recording of the phonetic unit with a particular associated set of acoustic and linguistic features. For example, column 306 represents potential diphone units that correspond to the sound of going from silence (#) to the middle of an H sound, column 306 represents potential diphone units that correspond to the sound of going from the middle of an H sound to the middle of an E (in hello) sound, column 310 represents potential diphone units that correspond to the sound of going from the middle of an E (in hello) sound to the middle of an L sound, column 312 represents potential diphone units that correspond to the sound of going from the middle of an L sound to the middle of an O (in hello sound), and column 314 represents potential diphone units that correspond to the sound of going from the middle of an O (in hello sound) to silence.

The individual potential units are selected based on the information available in the voice inventory about the acoustic properties of the potential units and how closely each potential unit matches the desired sound for the target unit sequence 302. How closely each respective unit matches the desired sound will be represented by a target cost. Thus, for example, unit #-$H_1$ will have a first target cost, unit #-$H_2$ will have a second target cost, unit #-$H_3$ will have a third target cost, and so on.

The TTS system then creates a graph of potential sequences of candidate units to synthesize the available speech. The size of this graph may be variable based on certain device settings. An example of this graph is shown in FIG. 3B. A number of potential paths through the graph are illustrated by the different dotted lines connecting the candidate units. A Viterbi algorithm may be used to determine potential paths through the graph. Each path may be given a score incorporating both how well the candidate units match the target units (with a high score representing a low target cost of the candidate units) and how well the candidate units concatenate together in an eventual synthesized sequence (with a high score representing a low join cost of those respective candidate units). The TTS system may select the sequence that has the lowest overall cost (represented by a combination of target costs and join costs) or may choose a sequence based on customized functions for target cost, join cost or other factors. For illustration purposes, the target cost may be thought of as the cost to select a particular unit in one of the columns of FIG. 3B whereas the join cost may be thought of as the score associated with a particular path from one unit in one column to another unit of another column. The candidate units along the selected path through the graph may then be combined together to form an output audio waveform representing the speech of the input text. For example, in FIG. 3B the selected path is represented by the solid line. Thus units #-$H_2$, H-$E_1$, E-$L_4$, L-$O_3$, and O-$\#_4$ may be selected, and their respective audio concatenated by synthesis component 220, to synthesize audio for the word "hello." This may continue for the input text data 210 to determine output audio data.

Vocoder-based parametric speech synthesis may be performed as follows. A TTS component 295 may include an acoustic model, or other models, which may convert a symbolic linguistic representation into a synthetic acoustic waveform of the text input based on audio signal manipulation. The acoustic model includes rules which may be used by the parametric synthesis engine 232 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 216.

The parametric synthesis engine 232 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 218, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency (f), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

Figure 4:
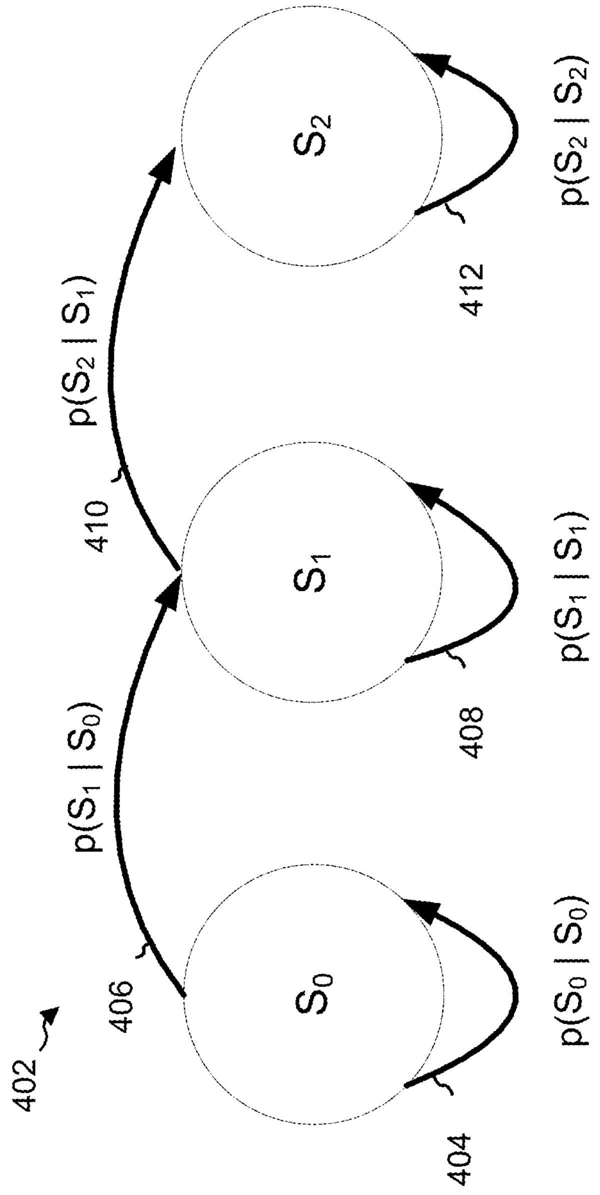
FIG. 4 illustrates speech synthesis using a hidden Markov model (HMM) to perform TTS processing according to embodiments of the present disclosure.

An example of HMM processing for speech synthesis is shown in FIG. 4. A sample input phonetic unit may be processed by a parametric synthesis engine 232. The parametric synthesis engine 232 may initially assign a probability that the proper audio output associated with that phoneme is represented by state $S_0$ in the Hidden Markov Model illustrated in FIG. 4. After further processing, the speech synthesis engine 218 determines whether the state should either remain the same, or change to a new state. For example, whether the state should remain the same 404 may depend on the corresponding transition probability (written as $P(S_0|S_0)$, meaning the probability of remaining in state $S_0$) and how well the subsequent frame matches states $S_0$ and $S_1$. If state $S_1$ is the most probable, the calculations move to state $S_1$ and continue from there. For subsequent phonetic units, the speech synthesis engine 218 similarly determines whether the state should remain at $S_1$, using the transition probability represented by $P(S_1|S_1)$ 408, or move to the next state, using the transition probability $P(S_2|S_1)$ 410. As the processing continues, the parametric synthesis engine 232 continues calculating such probabilities including the probability 412 of remaining in state $S_2$ or the probability of moving from a state of illustrated phoneme /E/ to a state of another phoneme. After processing the phonetic units and acoustic features for state $S_2$, the speech recognition may move to the next phonetic unit in the input text.

The probabilities and states may be calculated using a number of techniques. For example, probabilities for each state may be calculated using a Gaussian model, Gaussian mixture model, or other technique based on the feature vectors and the contents of the TTS storage 280. Techniques such as maximum likelihood estimation (MLE) may be used to estimate the probability of particular states.

In addition to calculating potential states for one audio waveform as a potential match to a phonetic unit, the parametric synthesis engine 232 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 232 may lead to a number of potential audio output sequences. Based on the acoustic model and other potential models, the potential audio output sequences may be scored according to a confidence level of the parametric synthesis engine 232. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 268, which may represent acoustic settings matching a particular parametric "voice", may be used by the synthesis component 220 to ultimately create the output audio data 290.

Figure 5:
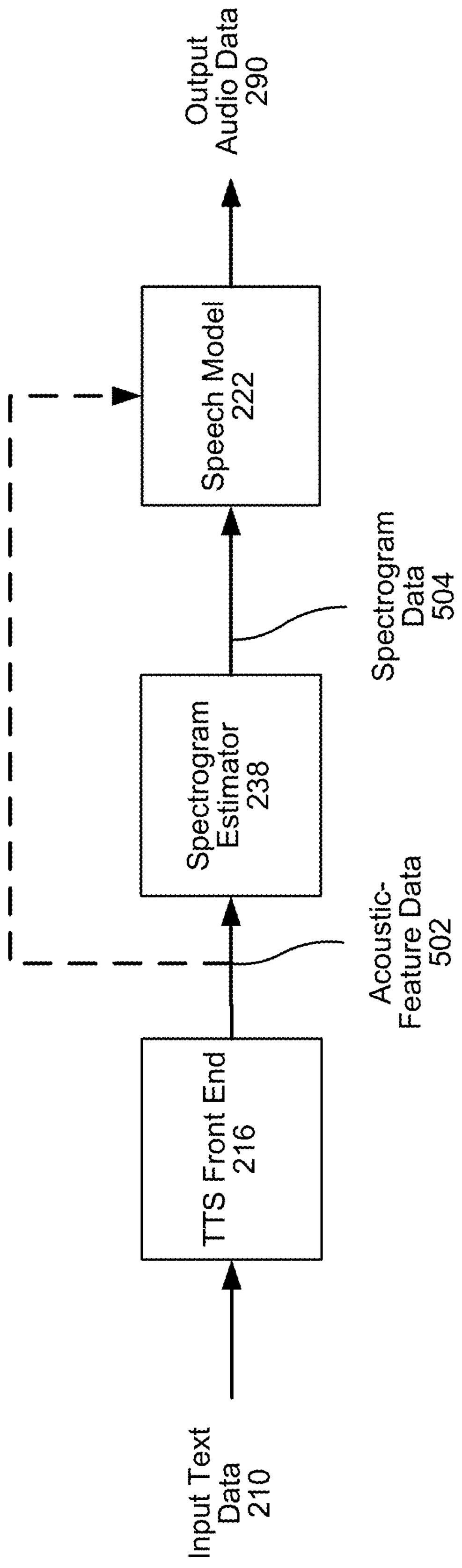
FIG. 5 illustrates a system for generating speech from text according to embodiments of the present disclosure.

FIG. 5 illustrates a system for synthesizing speech from text in accordance with embodiments of the present disclosure. As explained above, a TTS front end 216 receives input text data 210, which may include text data such as ASCII text data, punctuation, tags, or other such data, and outputs corresponding acoustic-feature data 502, which may include text characters, punctuation, and/or acoustic units such as phones, phonemes, syllable-level features, word-level features, or other features related to emotion, speaker, accent, language, etc. A spectrogram estimator 238 receives the acoustic-feature data 502 (and, in some embodiments, the input text data 210) and outputs corresponding spectrogram data 504. A speech model 222 outputs output audio data 290 based on the spectrogram data 504. In some embodiments, the speech model 222 also receives the acoustic-feature data 502 and/or input text data 210.

Figure 6:
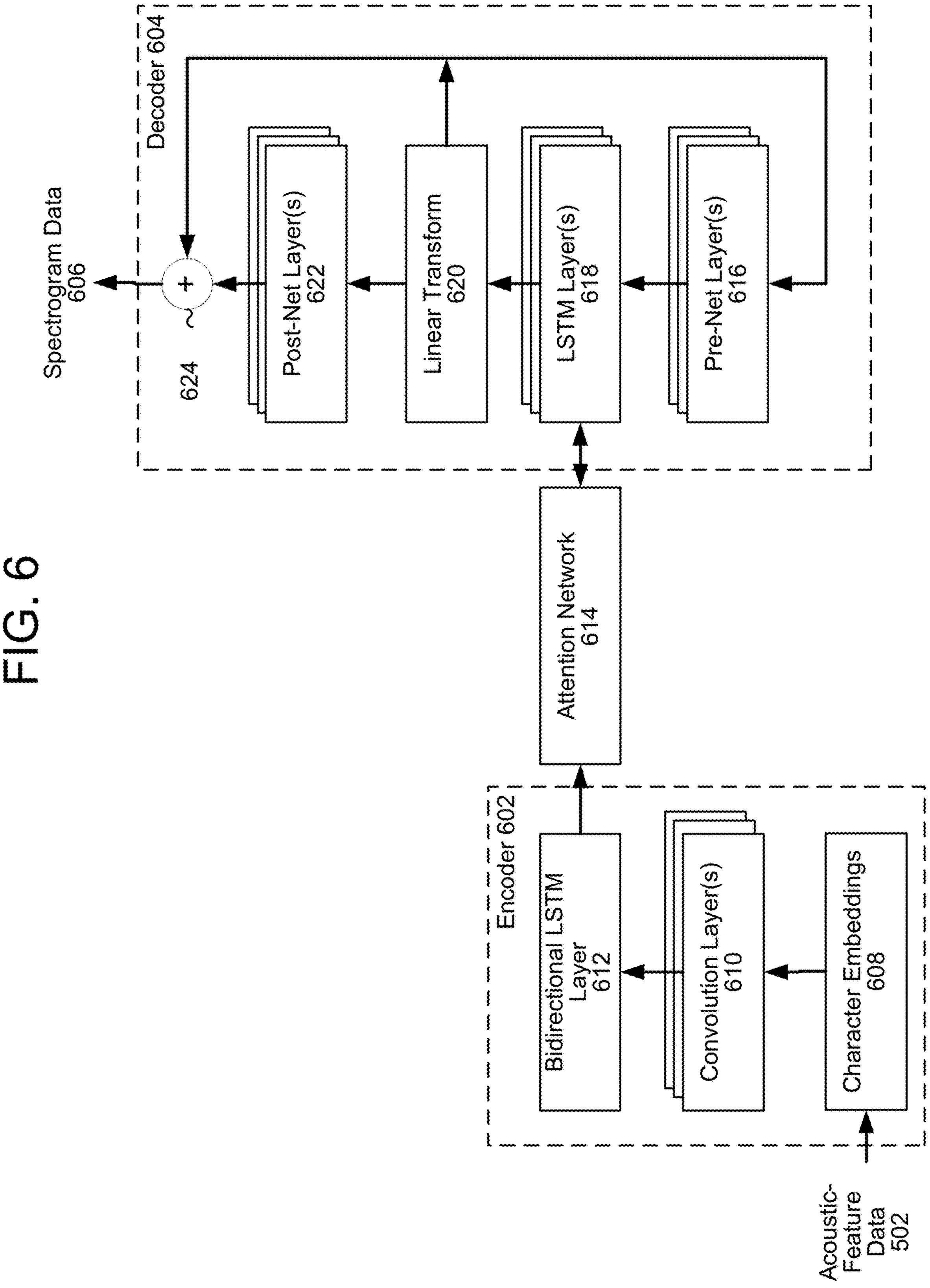
FIG. 6 illustrates a spectrogram estimator according to embodiments of the present disclosure.

FIG. 6 illustrates a spectrogram estimator 238 in accordance with embodiments of the present disclosure. As mentioned above, the spectrogram estimator 238 may include one or more encoders 602 for encoding one or more types of acoustic-feature data 502 into one or more feature vectors. A decoder 604 receive the one or more feature vectors and create corresponding spectrogram data 606. In various embodiments, the encoder 602 steps through input time steps and encodes the acoustic-feature data 502 into a fixed length vector called a context vector; the decoder 604 steps through output time steps while reading the context vector to create the spectrogram data 606.

The encoder 602 may receive the acoustic-feature data 502 and/or input text data 210 and generate character embeddings 608 based thereon. The character embeddings 608 may represent the acoustic-feature data 502 and/or input text data 210 as a defined list of characters, which may include, for example, English characters (e.g., a-z and A-Z), numbers, punctuation, special characters, and/or unknown characters. The character embeddings 608 may transform the list of characters into one or more corresponding vectors using, for example, one-hot encoding. The vectors may be multi-dimensional; in some embodiments, the vectors represent a learned 512-dimensional character embedding.

The character embeddings 608 may be processed by one or more convolution layer(s) 610, which may apply one or more convolution operations to the vectors corresponding to the character embeddings 608. In some embodiments, the convolution layer(s) 610 correspond to three convolutional layers each containing 512 filters having shapes of 5×1, i.e., each filter spans five characters. The convolution layer(s) 610 may model longer-term context (e.g., N-grams) in the character embeddings 608.

The final output of the convolution layer(s) 610 (i.e., the output of the only or final convolutional layer) may be passed to a bidirectional LSTM layer 612 to generate encodings corresponding to the acoustic-feature data 502. In some embodiments, the bidirectional LSTM layer 612 includes 512 units—256 in a first direction and 256 in a second direction.

In some embodiments, the spectrogram estimator 238 includes an attention network 614 that summarizes the full encoded sequence output by the bidirectional LSTM layer 612 as fixed-length context vectors corresponding to output step of the decoder 604. The attention network 614 may a RNN, DNN, or other network discussed herein, and may include nodes having weights and/or cost functions arranged into one or more layers. Attention probabilities may be computed after projecting inputs to 128-dimensional hidden representations. In some embodiments, the attention network 614 weights certain values of the context vector before sending them to the decoder 604. The attention network 614 may, for example, weight certain portions of the context vector by increasing their value and may weight other portions of the context vector by decreasing their value. The increased values may correspond to acoustic features to which more attention should be paid by the decoder 604 and the decreased values may correspond to acoustic feature to which less attention should be paid by the decoder 604.

Use of the attention network 614 may permit the encoder 602 to avoid encoding the full source acoustic-feature data 502 into a fixed-length vector; instead, the attention network 614 may allow the decoder 604 to "attend" to different parts of the acoustic-feature data 502 at each step of output generation. The attention network 614 may allow the encoder 602 and/or decoder 604 to learn what to attend to based on the acoustic-feature data 502 and/or produced spectrogram data 606.

The decoder 604 may be a network, such as a neural network; in some embodiments, the decoder is an autoregressive recurrent neural network (RNN). The decoder 604 may generate the spectrogram data 606 from the encoded acoustic-feature data 502 one frame at a time. The spectrogram data 606 may represent a prediction of frequencies corresponding to the output audio data 290. For example, if the output audio data 290 corresponds to speech denoting a fearful emotion, the spectrogram data 606 may include a prediction of higher frequencies; if the output audio data 290 corresponds to speech denoting a whisper, the spectrogram data 606 may include a prediction of lower frequencies. In some embodiments, the spectrogram data 606 includes frequencies adjusted in accordance with a Mel scale, in which the spectrogram data 606 corresponds to a perceptual scale of pitches judged by listeners to be equal in distance from one another. In these embodiments, the spectrogram data 606 may include or be referred to as a Mel-frequency spectrogram and/or a Mel-frequency cepstrum (MFC).

The decoder 604 may include one or more pre-net layers 616. The pre-net layers 616 may include two fully connected layers of 256 hidden units, such as rectified linear units (ReLUs). The pre-net layers 616 receive spectrogram data 606 from a previous time-step and may act as information bottleneck, thereby aiding the attention network 614 in focusing attention on particular outputs of the encoder 602. In some embodiments, use of the pre-net layer(s) 616 allows the decoder 604 to place a greater emphasis on the output of the attention network 614 and less emphasis on the spectrogram data 606 from the previous time-temp.

The output of the pre-net layers 616 may be concatenated with the output of the attention network 614. One or more LSTM layer(s) 618 may receive this concatenated output. The LSTM layer(s) 618 may include two uni-directional LSTM layers, each having 1024 units. The output of the LSTM layer(s) 618 may be transformed with a linear transform 620, such as a linear projection. In other embodiments, a different transform, such as an affine transform, may be used. One or more post-net layer(s) 622, which may be convolution layers, may receive the output of the linear transform 620; in some embodiments, the post-net layer(s) 622 include five layers, and each layer includes 512 filters having shapes 5×1 with batch normalization; tan h activations may be performed on outputs of all but the final layer. A concatenation element 624 may concatenate the output of the post-net layer(s) 622 with the output of the linear transform 620 to generate the spectrogram data 606.

Figure 7:
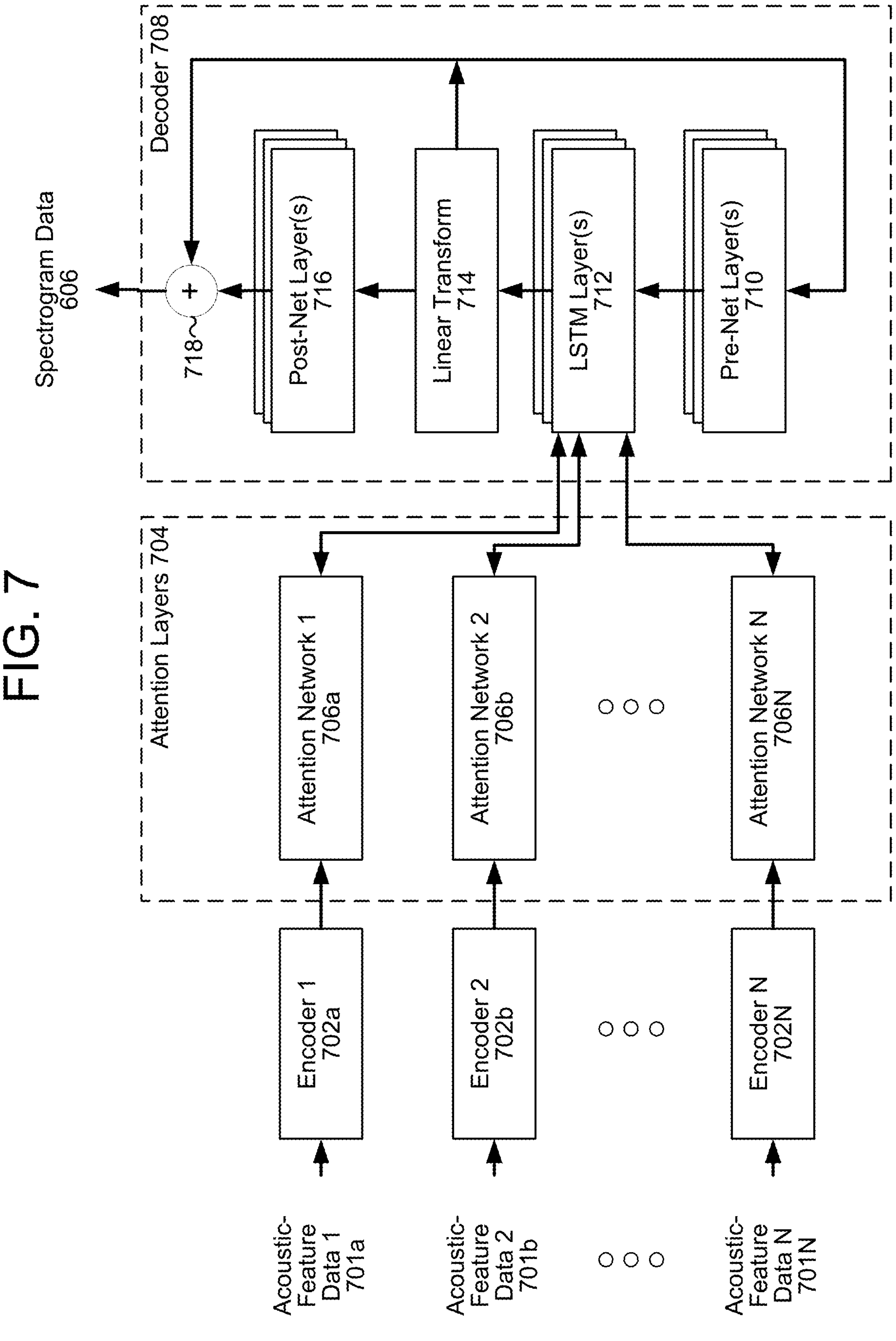
FIG. 7 illustrates another spectrogram estimator according to embodiments of the present disclosure.

FIG. 7 illustrates a spectrogram estimator 238 in accordance with embodiments of the present invention. The spectrogram estimator 238 includes N encoders 702*a*, 702*b*, . . . 702N and attention layers 704 that include N attention networks 706*a*, 706*b*, . . . 706N. As explained above, with reference to FIG. 6, each encoder 702*a*, 702*b*, . . . 702N may include character embeddings that transform input acoustic-feature data 701*a*, 701*b*, . . . 701N into one or more corresponding vectors, may include one or more convolution layer(s), which may apply one or more convolution operations to the vectors corresponding to the character embeddings, and/or may include a bidirectional LSTM layer to generate encodings corresponding to the acoustic-feature data 701*a*, 701*b*, . . . 701N. The attention network may a RNN, DNN, or other network discussed herein, and may include nodes having weights and cost functions arranged into one or more layers. The present disclosure is not limited to any particular type of encoder and/or attention network, however.

As explained above, the acoustic-feature data 701*a*, 701*b*, . . . 701N may correspond to different types of acoustic data; the different types of acoustic data may have different time resolutions. For example, first acoustic-feature data 701*a* may correspond to phoneme data having a first time resolution, second acoustic-feature data 701*b* may correspond to syllable-level data having a second time resolution greater than the first time resolution, and third acoustic-feature data 701*c* may correspond to word-level data having a third time resolution greater than the second time resolution. Other types of acoustic data, as explained above, may include emotion data, accent data, and speaker data.

The outputs of the attention networks 706*a*, 706*b*, . . . 706N may be received by a decoder 708. As also explained above, the decoder 708 may include one or more pre-net layer(s) 710, one or more LSTM layer(s) 712, a linear transform/projection element 714, one or more post-net layer(s) 716, and/or a summation element 718. The present disclosure is not, however, limited to only these types and arrangement of layers and elements.

Each encoder 702*a*, 702*b*, . . . 702N and/or corresponding attention network 706*a*, 706*b*, . . . 706N may correspond to a particular speaking style, type of person, and/or particular person. Each encoder 702*a*, 702*b*, . . . 702N and/or corresponding attention network 706*a*, 706*b*, . . . 706N may be trained using training data corresponding to the particular speaking style, type of person, and/or particular person. More than one corpus of training data may be used; in these embodiments, each encoder 702*a*, 702*b*, . . . 702N and/or corresponding attention network 706*a*, 706*b*, . . . 706N may correspond to a merged or combined speaking style corresponding to multiple speaking styles, types of person, and/or particular persons.

The encoders 702*a*, 702*b*, . . . 702N and/or corresponding attention networks 706*a*, 706*b*, . . . 706N may be trained in a particular style and then used at runtime to create spectrogram data 606 corresponding to the style. In some embodiments, multiple encoders 702*a*, 702*b*, . . . 702N and/or corresponding attention networks 706*a*, 706*b*, . . . 706N may be trained for each type of acoustic-feature data 701*a*, 701*b*, . . . 701N and particular encoders 702*a*, 702*b*, . . . 702N and/or corresponding attention networks 706*a*, 706*b*, . . . 706N may be selected at runtime. For example, a first set of encoders 702*a*, 702*b*, . . . 702N and/or corresponding attention networks 706*a*, 706*b*, . . . 706N may correspond to a first speech style, person, or accent and a second set of encoders 702*a*, 702*b*, . . . 702N and/or corresponding attention networks 706*a*, 706*b*, . . . 706N may correspond to a second speech style, person, or accent. A user may request that the spectrogram estimator 238 use the first style or the second style.

In some embodiments, a first set of encoders 702*a*, 702*b*, . . . 702N and/or corresponding attention networks 706*a*, 706*b*, . . . 706N is trained using a first corpus of training data and a second set of encoders 702*a*, 702*b*, . . . 702N and/or corresponding attention networks 706*a*, 706*b*, . . . 706N is trained using a second corpus of training data. In other embodiments, one or more encoders and/or corresponding attention networks in the first set is used to replace one or more encoders and/or corresponding attention networks in the second set. For example, an encoder and/or corresponding attention network that corresponds to a particular accent may be used to provide a speech style corresponding to that accent in another set of encoders and/or corresponding attention networks that lacks that accent. Thus, for example, if a user wishes to output speech having an English accent but that is otherwise in the speech style of the user (having the same tone, cadence, pitch, etc.), the spectrogram estimator 238 may select an encoder and/or corresponding attention network that corresponds to the English accent for use therein. In some embodiments, the user may input audio containing the user's own speech; a speech-to-text system may generate text based on the user's speech, and the spectrogram estimator 238.

Figure 8:
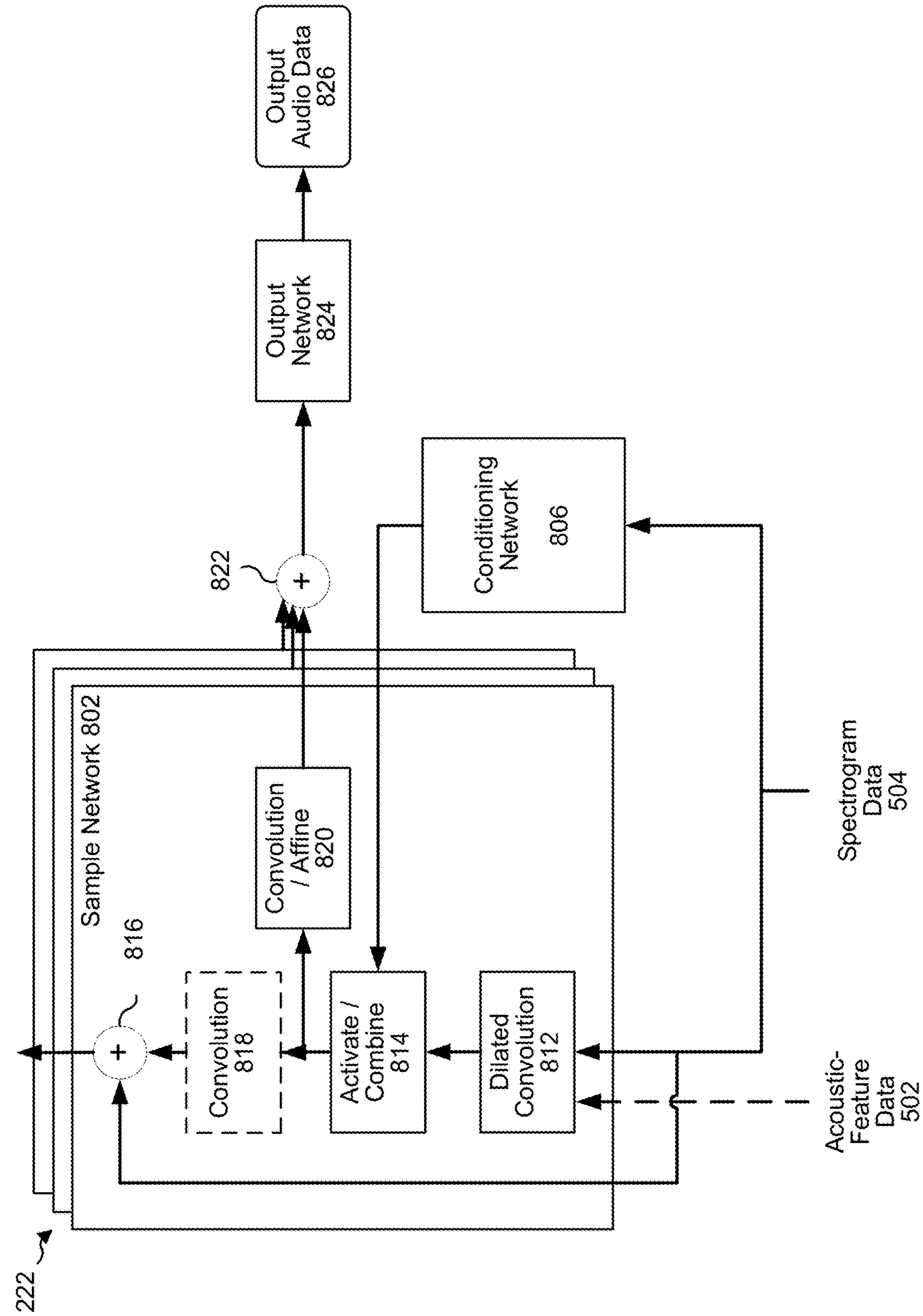
FIG. 8 illustrates a speech model for generating audio data according to embodiments of the present disclosure.

FIG. 8 illustrates an embodiment of the speech model 222, which may include a sample network 802, an output network 804, and a conditioning network 806, each of which are described in greater detail below. The TTS front end 216, as described above, may receive the input text data 210 and generate acoustic data 504, which may include phoneme data, syllable-level feature data, word-level feature data, or other feature data, as described above. During training, the acoustic data-feature 502 may include prerecorded audio data and corresponding text data created for training the speech model 222. In some embodiments, during runtime, the TTS front end 216 includes a first-pass speech synthesis engine that creates speech using, for example, the unit selection and/or parametric synthesis techniques described above.

The sample network 802 may include a dilated convolution component 812. The dilated convolution component 812 receives the spectrogram data 504 as input performs a filter over an area of this input larger than the length of the filter by skipping input values with a certain step size, depending on the layer of the convolution. In some embodiments, the sample network also receives the acoustic-feature data 502 as input. For example, the dilated convolution component 812 may operate on every sample in the first layer, every second sample in the second layer, every fourth sample in the third layer, and so on. The dilated convolution component 812 may effectively allow the speech model 222 to operate on a coarser scale than with a normal convolution. The input to the dilated convolution component 812 may be, for example, a vector of size r created by performing a 2×1 convolution and a tan h function on an input audio one-hot vector. The output of the dilated convolution component 812 may be a vector of size 2r.

An activation/combination component 814 may combine the output of the dilated convolution component 812 with one or more outputs of the conditioning network 806, as described in greater detail below, and/or operated on by one or more activation functions, such as tan h or sigmoid functions, as also described in greater detail below. The activation/combination component 814 may combine the 2*r* vector output by the dilated convolution component 812 into a vector of size r. The present disclosure is not, however, limited to any particular architecture related to activation and/or combination.

The output of the activation/combination component 814 may be combined, using a combination component 816, with the input to the dilated convolution component 812. In some embodiments, prior to this combination, the output of the activation/combination component 814 is convolved by a second convolution component 818, which may be a 1×1 convolution on r values.

The sample network 802 may include one or more layers, each of which may include some or all of the components described above. In some embodiments, the sample network 802 includes 40 layers, which may be configured in four blocks with ten layers per block; the output of each combination component 816, which may be referred to as residual channels, may include 128 values; and the output of each convolution/affine component 820, which may be referred to as skip channels, may include 1024 values. The dilation performed by the dilated convolution component 812 may be $2^n$ for each layer n, and may be reset at each block.

The first layer may receive the acoustic-feature data 502 as input; the output of the first layer, corresponding to the output of the combination component 814, may be received by the dilated convolution component 812 of the second layer. The output of the last layer may be unused. As one of skill in the art will understand, a greater number of layers may result in higher-quality output speech at the cost of greater computational complexity and/or cost; any number of layers is, however, within the scope of the present disclosure. In some embodiments, the number of layers may be limited in the latency between the first layer and the last layer, as determined by the characteristics of a particular computing system, and the output audio rate (e.g., 16 kHz).

A convolution/affine component 820 may receive the output (of size r) of the activation/combination component 814 and perform a convolution (which may be a 1×1 convolution) or an affine transformation to produce an output of size s, wherein s<r. In some embodiments, this operation may also be referred to as a skip operation or a skip-connection operation, in which only a subset of the outputs from the layers of the sample network 802 are used as input by the convolution/affine component 820. The output of the convolution/affine component 820 may be combined using a second combination component 822, the output of which may be received by an output network 824 to create output audio data 826, which is also explained in greater detail below. An output of the output network 824 may be fed back to the TTS front end 216.

Figure 9A:
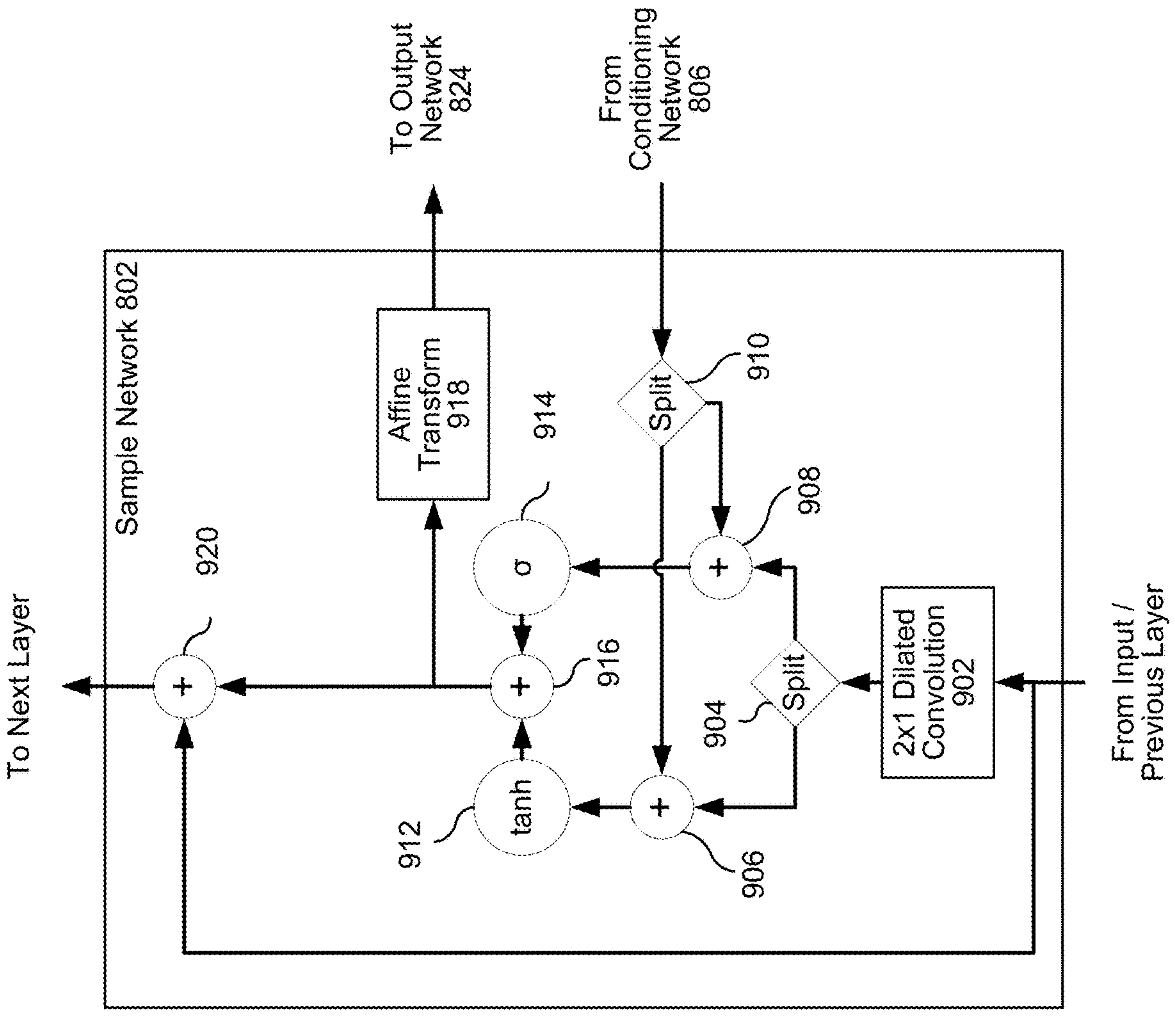
FIGS. 9A, 9B, and 9C illustrate networks for generating audio sample components according to embodiments of the present disclosure.
Figure 9B:
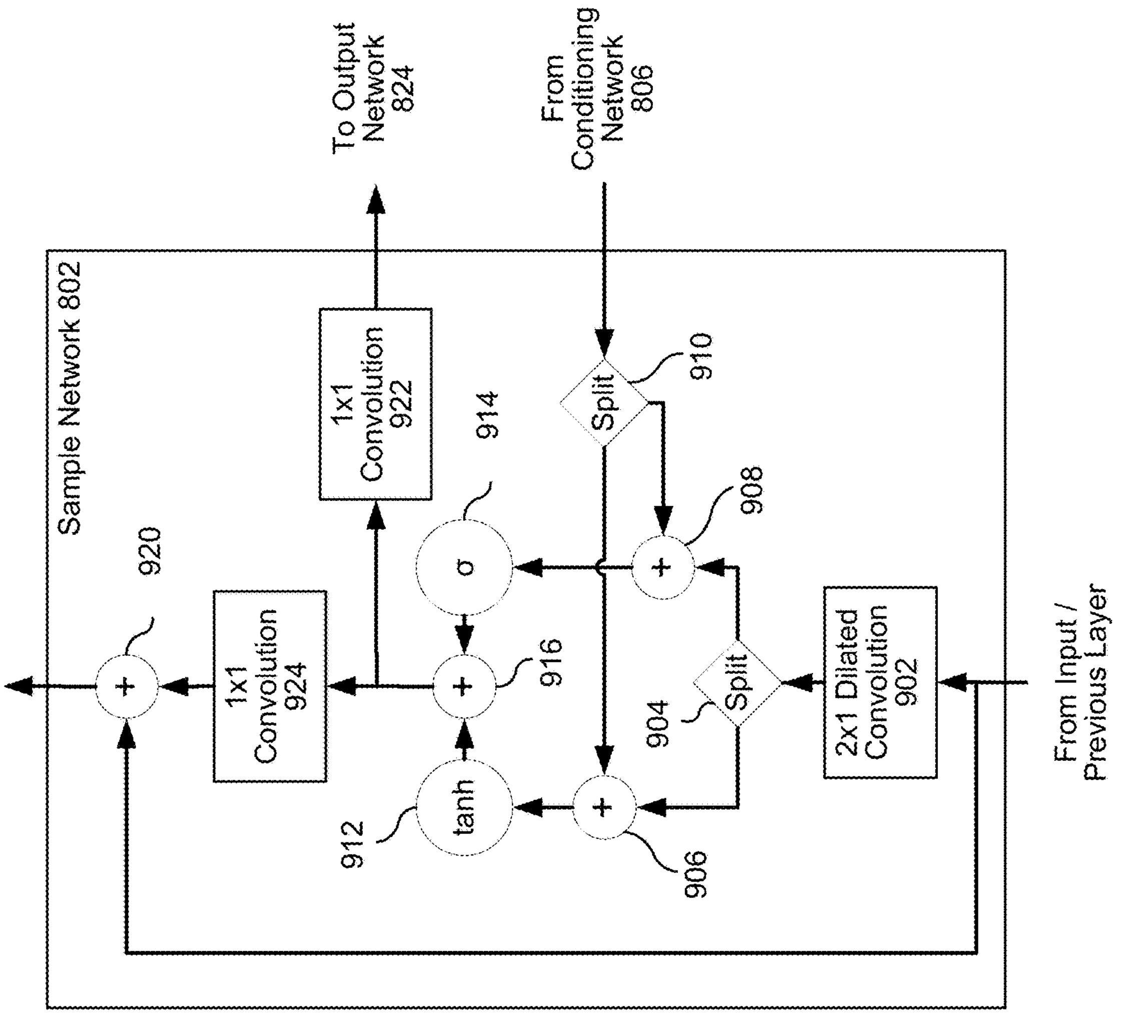

FIGS. 9A and 9B illustrate embodiments of the sample network 802. Referring first to FIG. 9A, a 2×1 dilated convolution component 902 receives a vector of size r from the TTS front end 216—which may be the spectrogram data 504—or from a previous layer of the sample network 802 and produces an output of size 2r. A split component 904 splits this output into two vectors, each of size r; these vectors are combined, using combination components 906 and 908, which the output of the conditioning network 806, which has been similarly split by a second split component 910. A tan h component 912 performs a tan h function on the first combination, a sigmoid component 914 performs a sigmoid function on the second combination, and the results of each function are combined using a third combination component 916. An affine transformation component 918 performs an affine transformation on the result and outputs the result to the output network 824. A fourth combination component 920 combines the output of the previous combination with the input and outputs the result to the next layer, if any.

Referring to FIG. 9B, many of the same functions described above with reference to FIG. 9A are performed. In this embodiment, however, a 1×1 convolution component 922 performs a 1×1 convolution on the output of the third combination component 916 in lieu of the affine transformation performed by the affine transformation component 918 of FIG. 9A. In addition, a second 1×1 convolution component 924 performs a second 1×1 convolution on the output of the third combination component 916, the output of which is received by the fourth combination component 920.

Figure 9C:
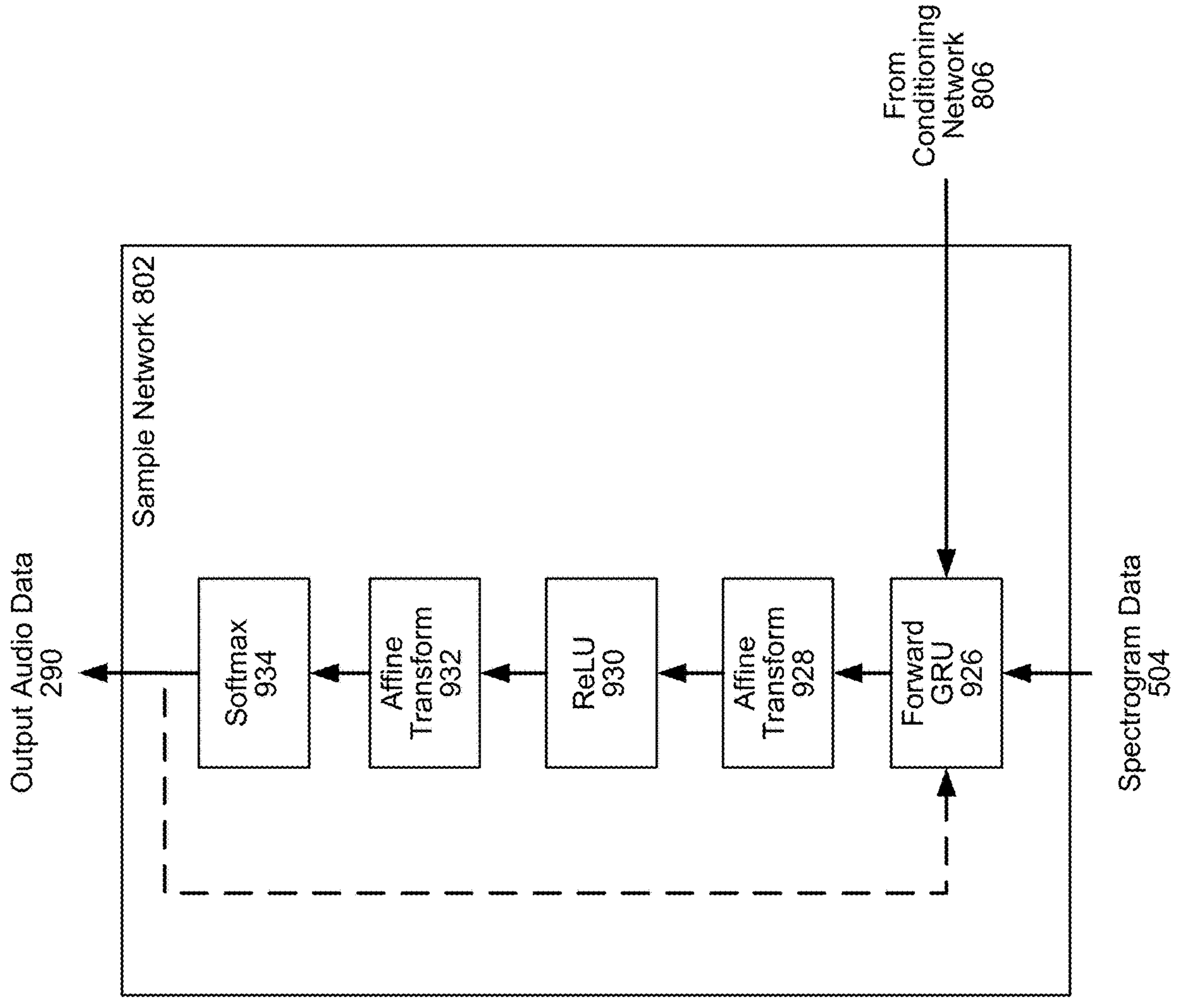

FIG. 9C illustrates another speech model in accordance with embodiments of the present disclosure. In these embodiments, a forward gated recurrent unit (GRU) 926 receives the acoustic-feature data 502 and the output 806 of the conditioning network. A first affine transform component 928 computes the affine transform of the output of the forward GRU 926. A rectified linear unit (ReLU) 930 receives the output of the first affine transform component 928; its output is transformed by a second affine transform component 932. A softmax component 934 receives the output of the second affine transform component 932 and generates the output audio data 290. The sample networks illustrated in FIGS. 9A, 9B, and 9C may each be trained using training data as described herein. In some embodiments, the simpler sample network 802 of FIG. 9C may be used with the spectrogram estimator 238 with no perceptible reduction in audio quality of the output audio data 290.

Figure 10A:
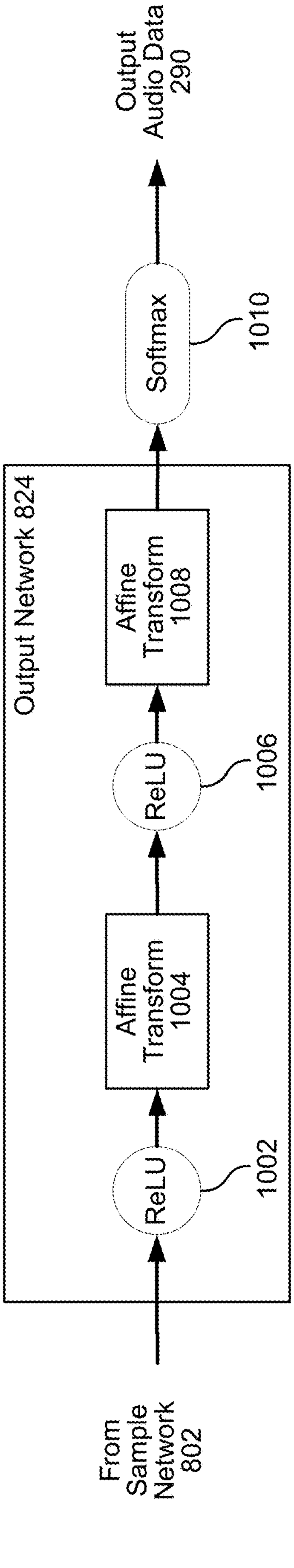
FIGS. 10A and 10B illustrate output networks for generating audio samples from audio sample components according to embodiments of the present disclosure.
Figure 10B:
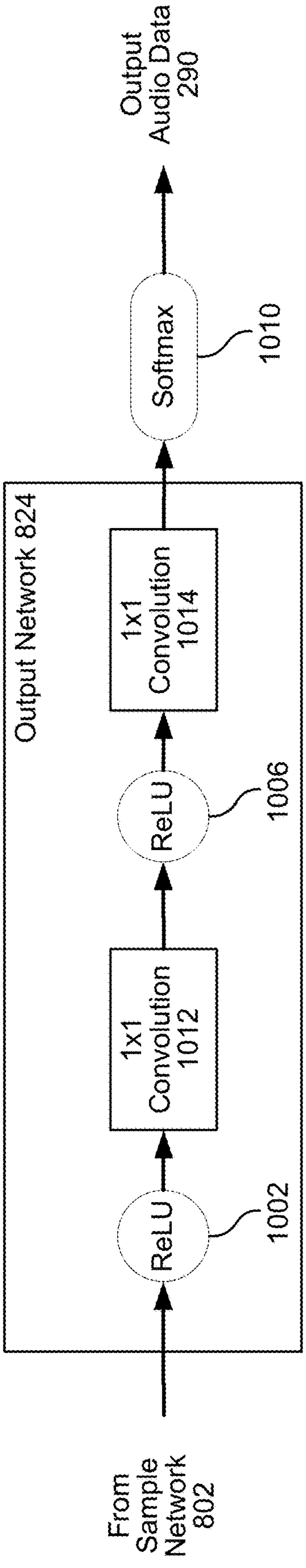

FIGS. 10A and 10B illustrate embodiments of the output network 824. Referring first to FIG. 10A, a first rectified linear unit (ReLU) 1002 may perform a first rectification function on the output of the sample network 802, and a first affine transform component 1004 may perform a first affine transform on the output of the ReLU 1002. The input vector to the first affine transform component 1004 may be of size s, and the output may be of size a. In various embodiments, s>a; a may represent the number of frequency bins corresponding to the output audio and may be of size ten. A second ReLU component 1006 performs a second rectification function, and a second affine transform component 1008 performs a second affine transform. A softmax component 1010 may be used to generate output audio data 290 from the output of the second affine transform component 1008. FIG. 10B is similar to FIG. 10A buy replaces affine transformation components 1004, 1008 with 1×1 convolution components 1012, 1014.

Figure 11A:
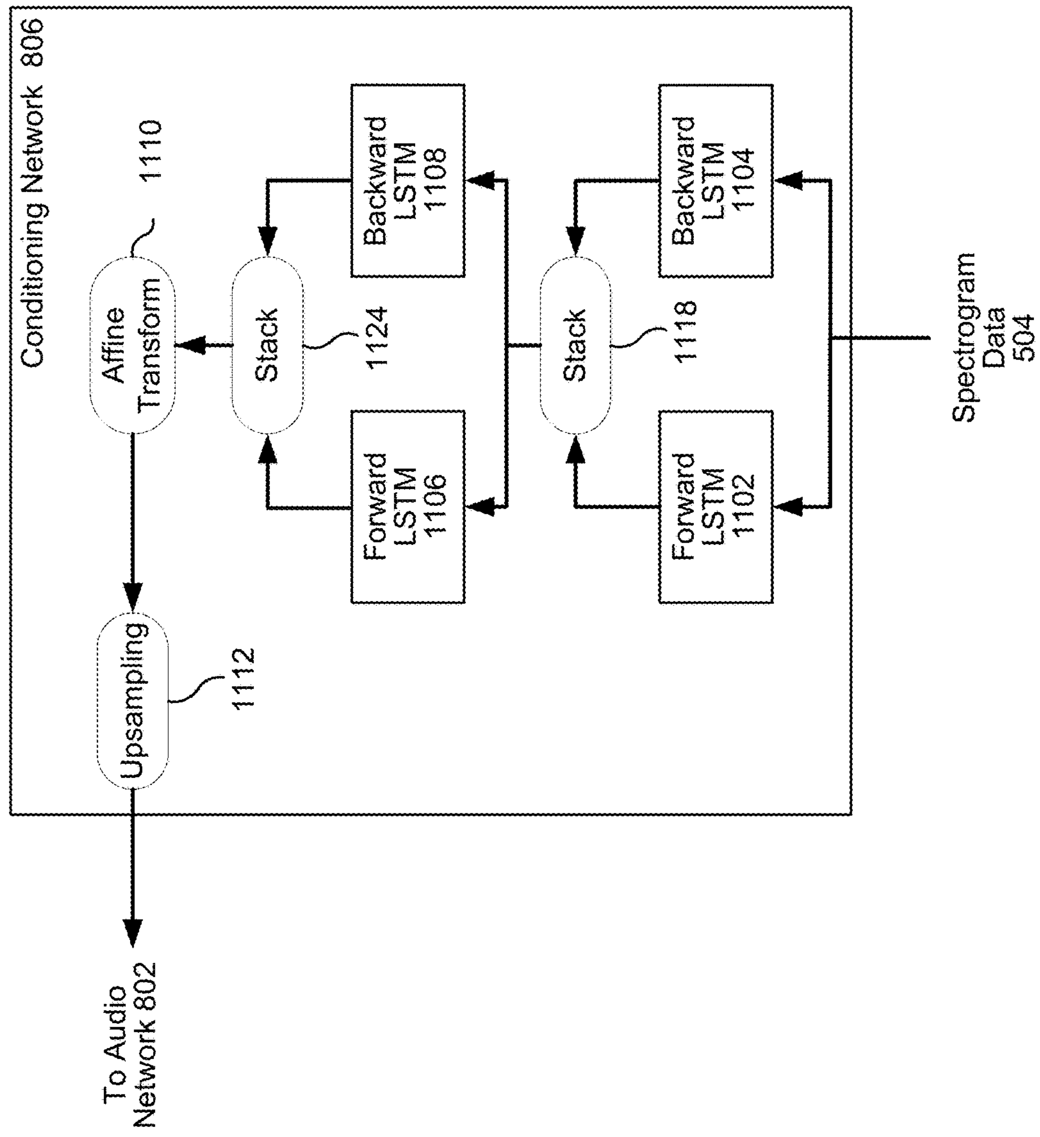
FIGS. 11A, 11B, and 11C illustrate conditioning networks for upsampling data according to embodiments of the present disclosure.
Figure 11B:
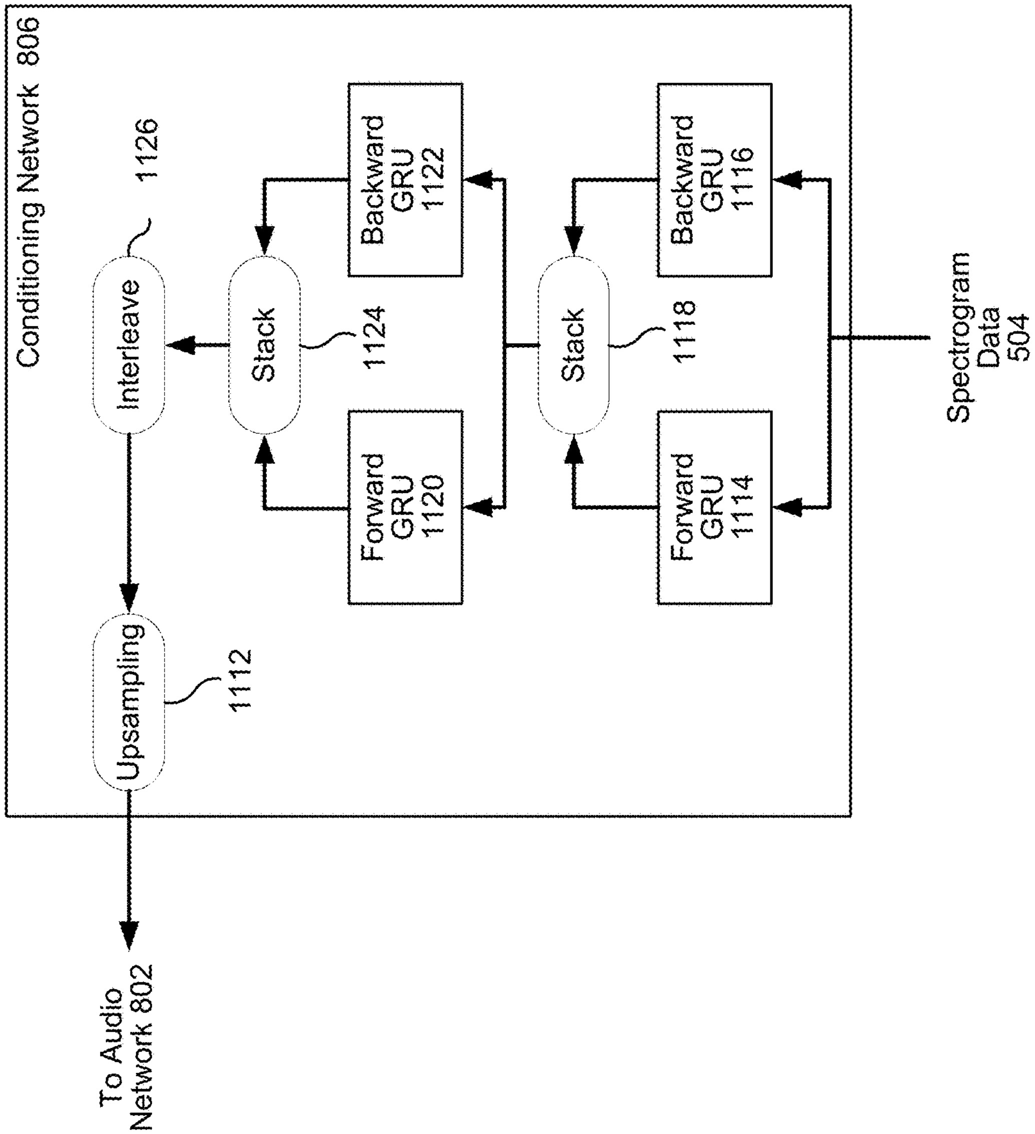
Figure 11C:
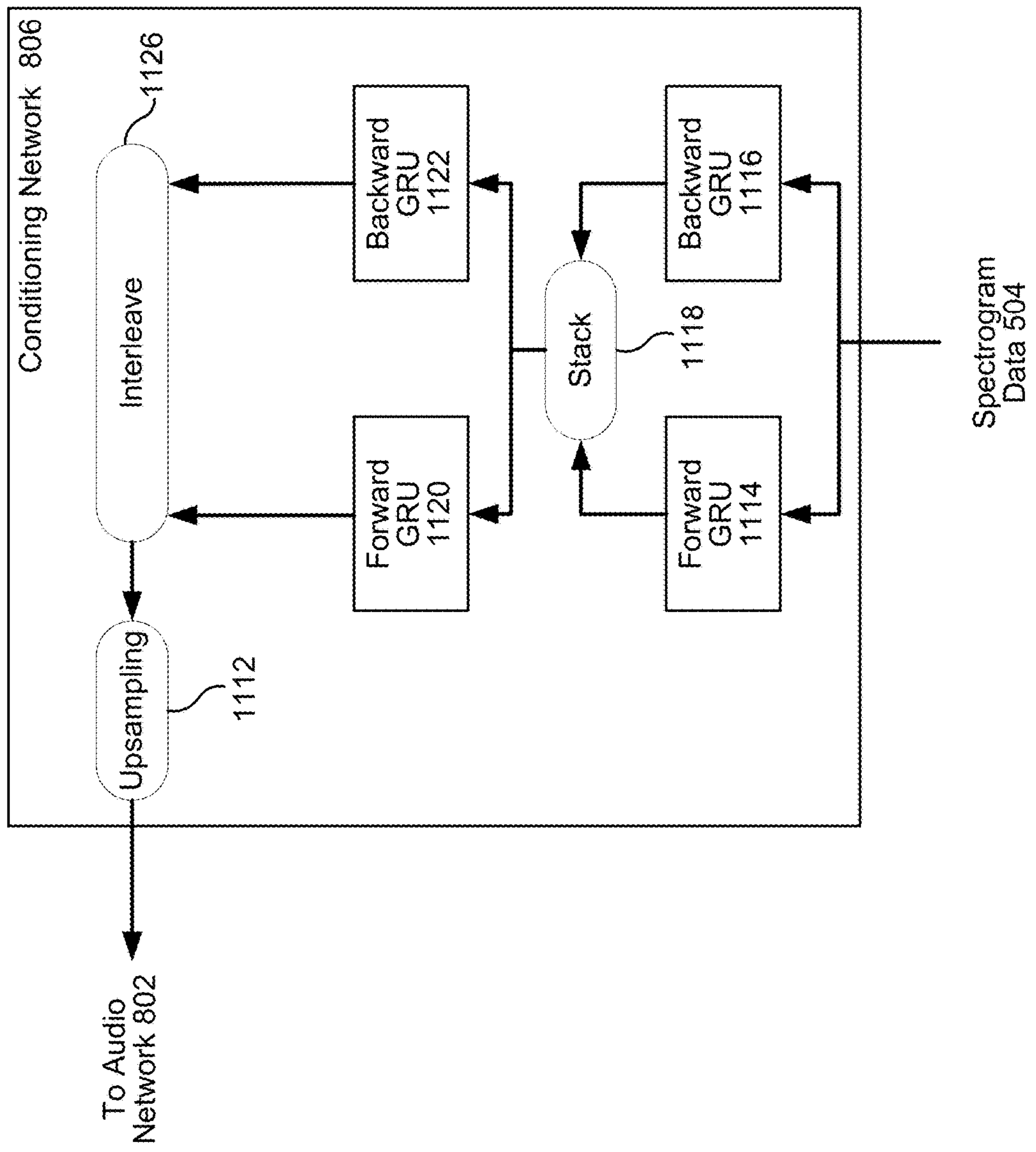

FIGS. 11A, 11B, and 11C illustrate embodiments of the conditioning network 216. In various embodiments, the spectrogram data 504 received by the conditioning network 216 is represented by a lower sample rate than the text/audio data received by the sample network 802. In some embodiments, the sample network 802 receives data sampled at 16 kHz while the conditioning network receives data sampled at 256 Hz. The conditioning network 216 may thus upsample the lower-rate input so that it matches the higher-rate input received by the sample network 802.

Referring to FIG. 11A, the spectrogram data 504 is received by a first forward long short-term memory (LSTM) 1102 and a first backward LSTM 1104. The outputs of both LSTMs 1102, 1104 may be received by a first stack element 1118, which may combine the outputs by summation, by concatenation, or by any other combination. The output of the first stack element 1118 is received by both a second forward LSTM 1106 and a second backward LSTM 1108. The outputs of the second LSTMs 1106, 1108 are combined using a second stack element 1124, the output of which is received by an affine transform component 1110 and upsampled by an upsampling component 1112. The output of the upsampling component 1112, as mentioned above, is combined with the sample network 802 using an activation/combination element 814. This output of the upsampling component 1112 represents an upsampled version of the spectrogram data 504, which may be referred to herein also as conditioning data, and may include numbers or vectors of numbers.

With reference to FIGS. 11B and 11C, in this embodiment, the spectrogram data 504 is received by a first forward gated recurrent unit (GRU) 1114 and first backward GRU 1116, the outputs of which are combined by a first stack component 1118. The output of the stack component 1118 is received by a second forward GRU 1120 and a second backward GRU 1122. The outputs of the second GRU 1120, 1122 are combined by a second stack component 1124, interleaved by an interleave component 1126, and then upsampled by the upsampling component 1112. In some embodiments, the neural networks 1114, 1116, 1120, 1122 include quasi-recurrent neural networks (QRNNs).

As mentioned above, the speech model 222 may be used in systems having existing TTS front ends, such as those developed for use with the unit selection and parametric speech systems described above. In other embodiments, however, the TTS front end may include one or more additional models that may be trained using training data, similar to how the speech model 222 may be trained.

Figure 12:
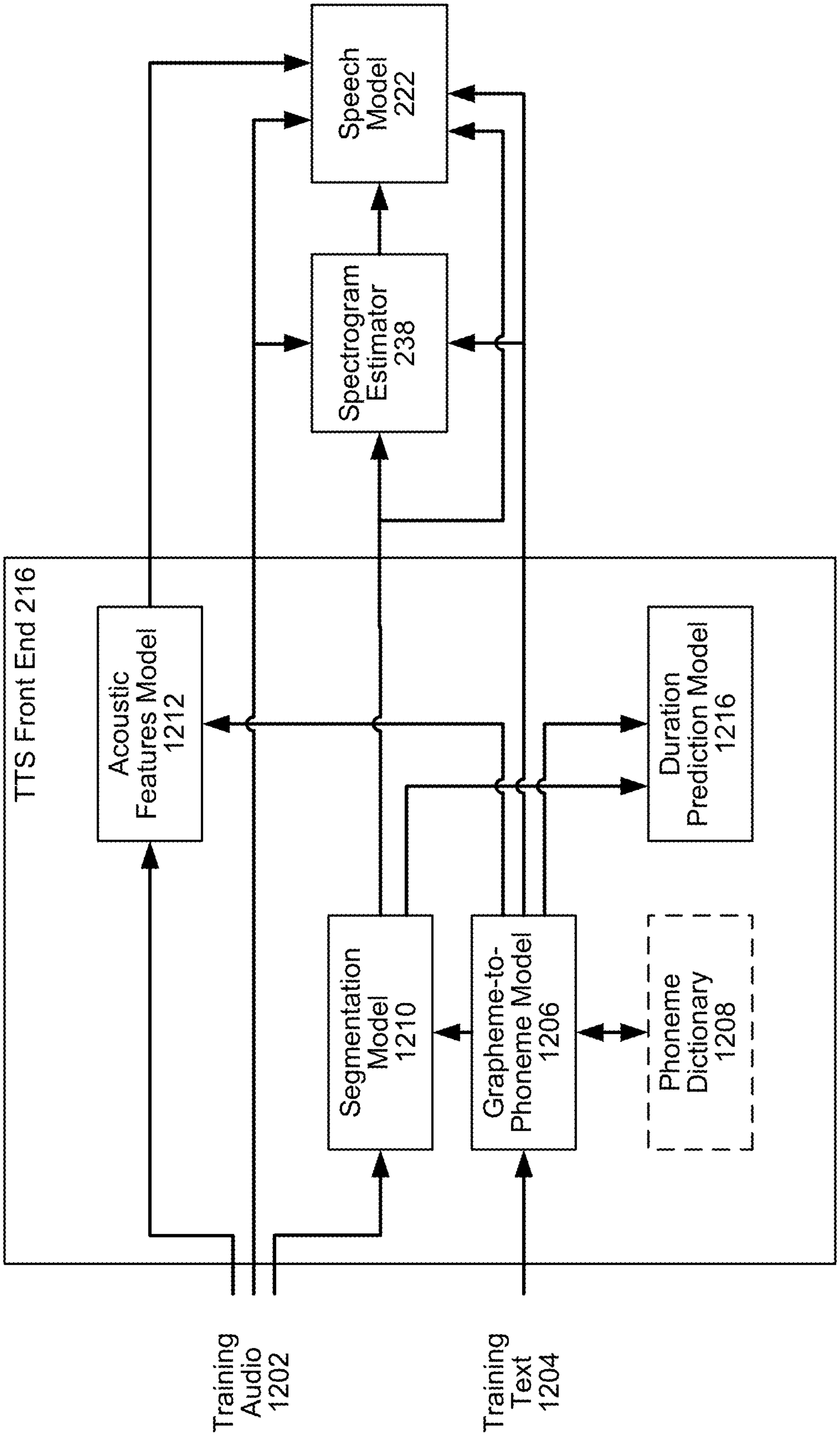
FIG. 12 illustrates training a speech model according to embodiments of the present disclosure.

FIG. 12 illustrates an embodiment of such a model-based TTS front end 216. FIG. 12 illustrates the training of the TTS front end XB16, the spectrogram estimator 238, and the speech model 222; FIG. SSK, described in more detail below, illustrates the trained TTS front end XB16, spectrogram estimator 238, and speech model 222 at runtime. Training audio 1202 and corresponding training text 1204 may be used to train the models.

A grapheme-to-phoneme model 1206 may be trained to convert the training text 1204 from text (e.g., English characters) to phonemes, which may be encoded using a phonemic alphabet such as ARPABET. The grapheme-to-phoneme model 1206 may reference a phoneme dictionary 1208. A segmentation model 1210 may be trained to locate phoneme boundaries in the voice dataset using an output of the grapheme-to-phoneme model 1206 and the training audio 1202. Given this input, the segmentation model 1210 may be trained to identify where in the training audio 1202 each phoneme begins and ends. An acoustic feature prediction model 1212 may be trained to predict acoustic features of the training audio, such as whether a phoneme is voiced, the fundamental frequency (F0) throughout the phoneme's duration, or other such features. A phoneme duration prediction model 1216 may be trained to predict the temporal duration of phonemes in a phoneme sequence (e.g., an utterance). The speech model receives, as inputs, the outputs of the grapheme-to-phoneme model 1206, the duration prediction model 1216, and the acoustic features prediction model 1212 and may be trained to synthesize audio at a high sampling rate, as described above.

Figure 13:
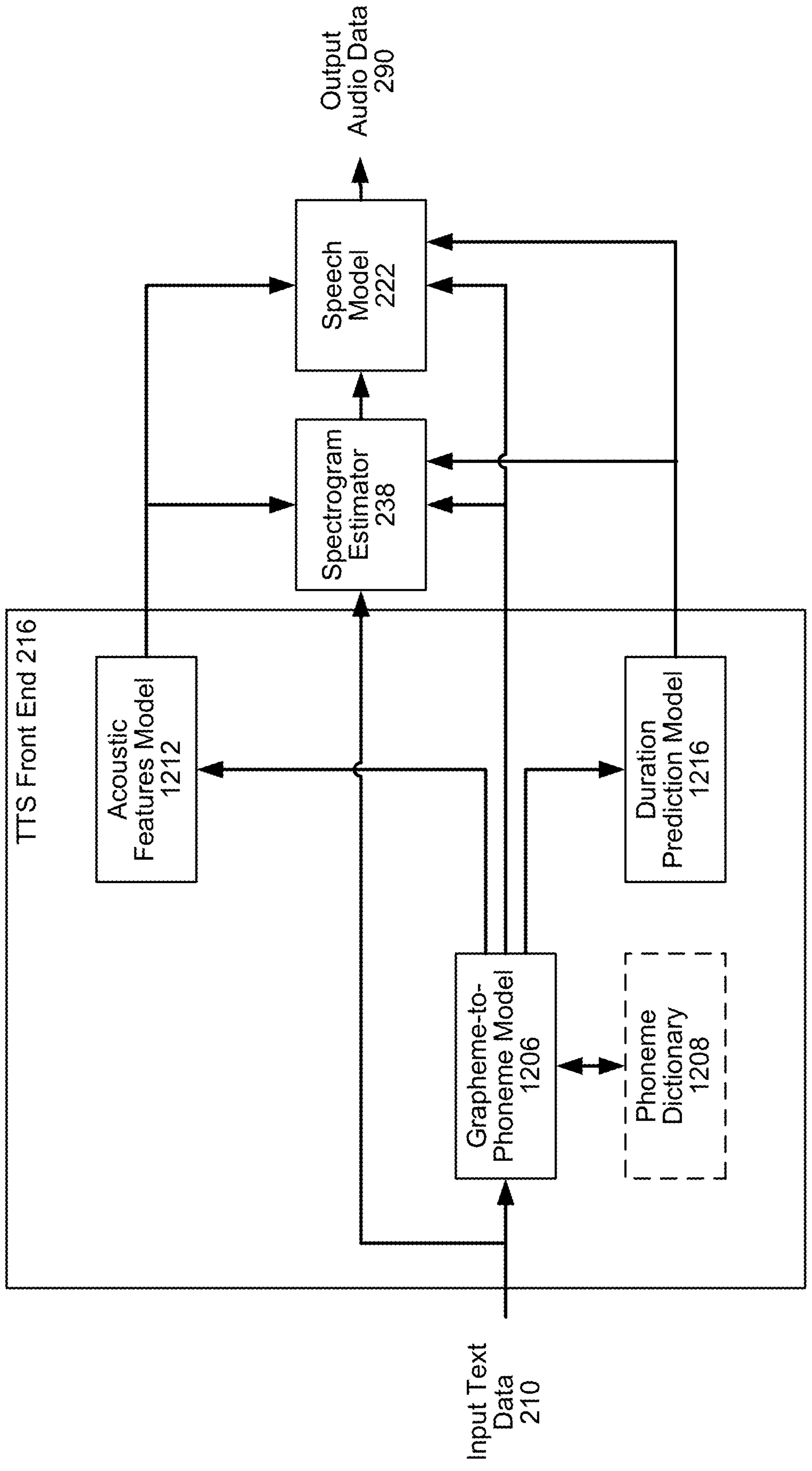
FIG. 13 illustrates runtime for a speech model according to embodiments of the present disclosure.

FIG. 13 illustrates use of the model-based TTS front end 216, spectrogram estimator 238, and speech model 222 during runtime. The grapheme-to-phoneme model 1206 receives input text data 210 and locates phoneme boundaries therein. Using this data, the acoustic features prediction model 1212 predicts acoustic features, such as phonemes, fundamental frequencies of phonemes, syllable-level features, word-level features, or other features and the duration prediction model 1216 predicts durations of phonemes, syllables, words, or other features. Using the phoneme data, acoustic data, and duration, data, the spectrogram estimator 238 and speech model 222 synthesize output audio data 290.

Audio waveforms (such as output audio data 290) including the speech output from the TTS component 295 may be sent to an audio output component, such as a speaker for playback to a user or may be sent for transmission to another device, such as another server 120, for further processing or output to a user. Audio waveforms including the speech may be sent in a number of different formats such as a series of feature vectors, uncompressed audio data, or compressed audio data. For example, audio speech output may be encoded and/or compressed by an encoder/decoder (not shown) prior to transmission. The encoder/decoder may be customized for encoding and decoding speech data, such as digitized audio data, feature vectors, etc. The encoder/decoder may also encode non-TTS data of the system, for example using a general encoding scheme such as .zip, etc.

Figure 14:
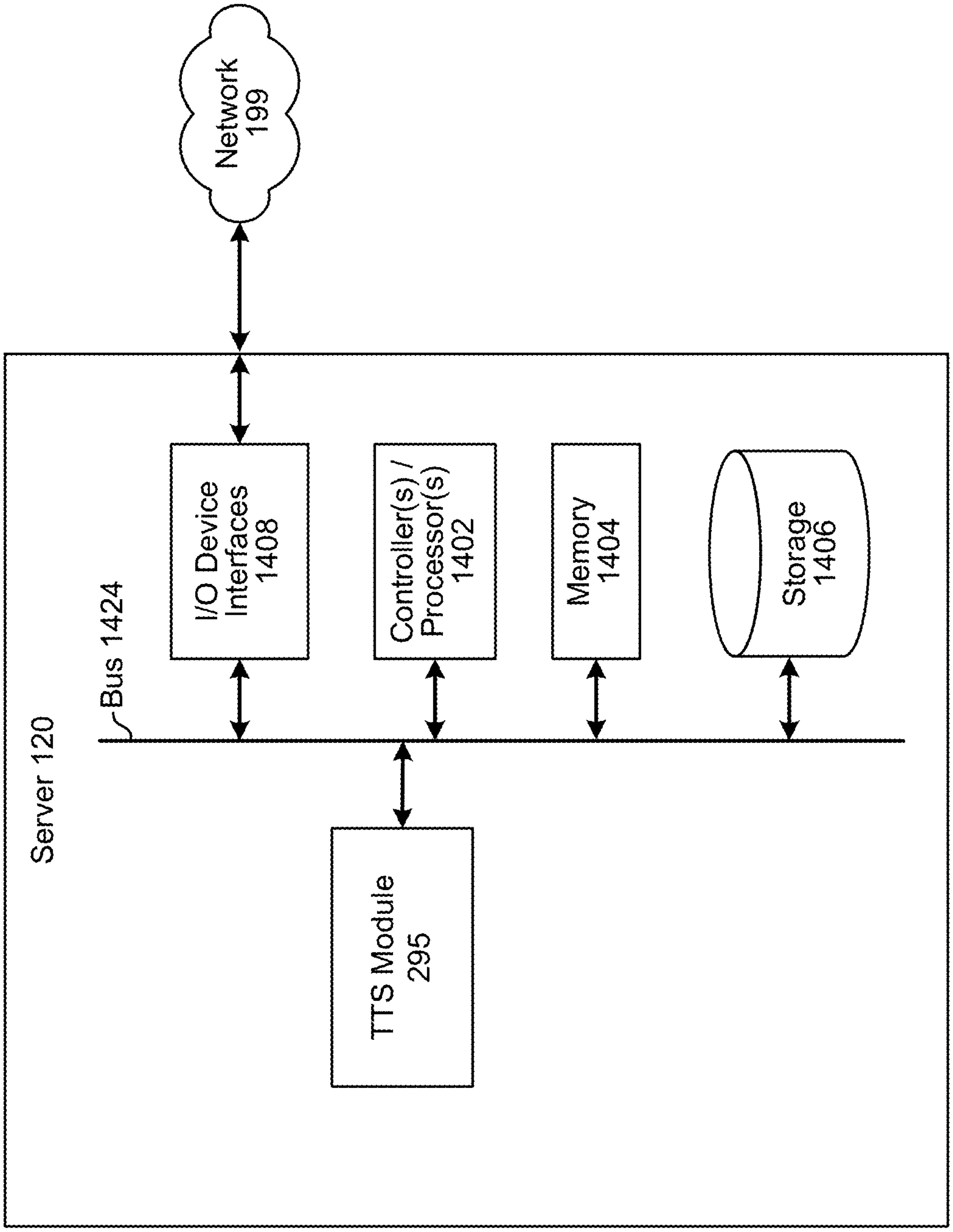
FIG. 14 illustrates a block diagram conceptually illustrating example components of a remote device, such as server(s), that may be used with the system according to embodiments of the present disclosure.

Although the above discusses a system, one or more components of the system may reside on any number of devices. FIG. 14 is a block diagram conceptually illustrating example components of a remote device, such as server(s) 120, which may determine which portion of a textual work to perform TTS processing on and perform TTS processing to provide an audio output. Multiple such servers 120 may be included in the system, such as one server 120 for determining the portion of the textual to process using TTS processing, one server 120 for performing TTS processing, etc. In operation, each of these devices may include computer-readable and computer-executable instructions that reside on the server(s) 120, as will be discussed further below.

Each server 120 may include one or more controllers/processors (1402), which may each include a central processing unit (CPU) for processing data and computer-readable instructions, and a memory (1404) for storing data and instructions of the respective device. The memories (1404) may individually include volatile random access memory (RAM), non-volatile read only memory (ROM), non-volatile magnetoresistive (MRAM) and/or other types of memory. Each server may also include a data storage component (1406), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1408). The storage component 1406 may include storage for various data including ASR models, NLU knowledge base, entity library, speech quality models, TTS voice unit storage, and other storage used to operate the system.

Computer instructions for operating each server (120) and its various components may be executed by the respective server's controller(s)/processor(s) (1402), using the memory (1404) as temporary "working" storage at runtime. A server's computer instructions may be stored in a non-transitory manner in non-volatile memory (1404), storage (1406), or an external device(s). Alternatively, some or all of the executable instructions may be embedded in hardware or firmware on the respective device in addition to or instead of software.

The server (120) may include input/output device interfaces (1408). A variety of components may be connected through the input/output device interfaces, as will be discussed further below. Additionally, the server (120) may include an address/data bus (1410) for conveying data among components of the respective device. Each component within a server (120) may also be directly connected to other components in addition to (or instead of) being connected to other components across the bus (1410). One or more servers 120 may include the TTS component 295, or other components capable of performing the functions described above.

As described above, the storage component 1406 may include storage for various data including speech quality models, TTS voice unit storage, and other storage used to operate the system and perform the algorithms and methods described above. The storage component 1406 may also store information corresponding to a user profile, including purchases of the user, returns of the user, recent content accessed, etc.

As noted above, multiple devices may be employed in a single system. In such a multi-device system, each of the devices may include different components for performing different aspects of the system. The multiple devices may include overlapping components. The components of the devices 110 and server(s) 120, as described with reference to FIG. 14, are exemplary, and may be located a stand-alone device or may be included, in whole or in part, as a component of a larger device or system.

Figure 15:
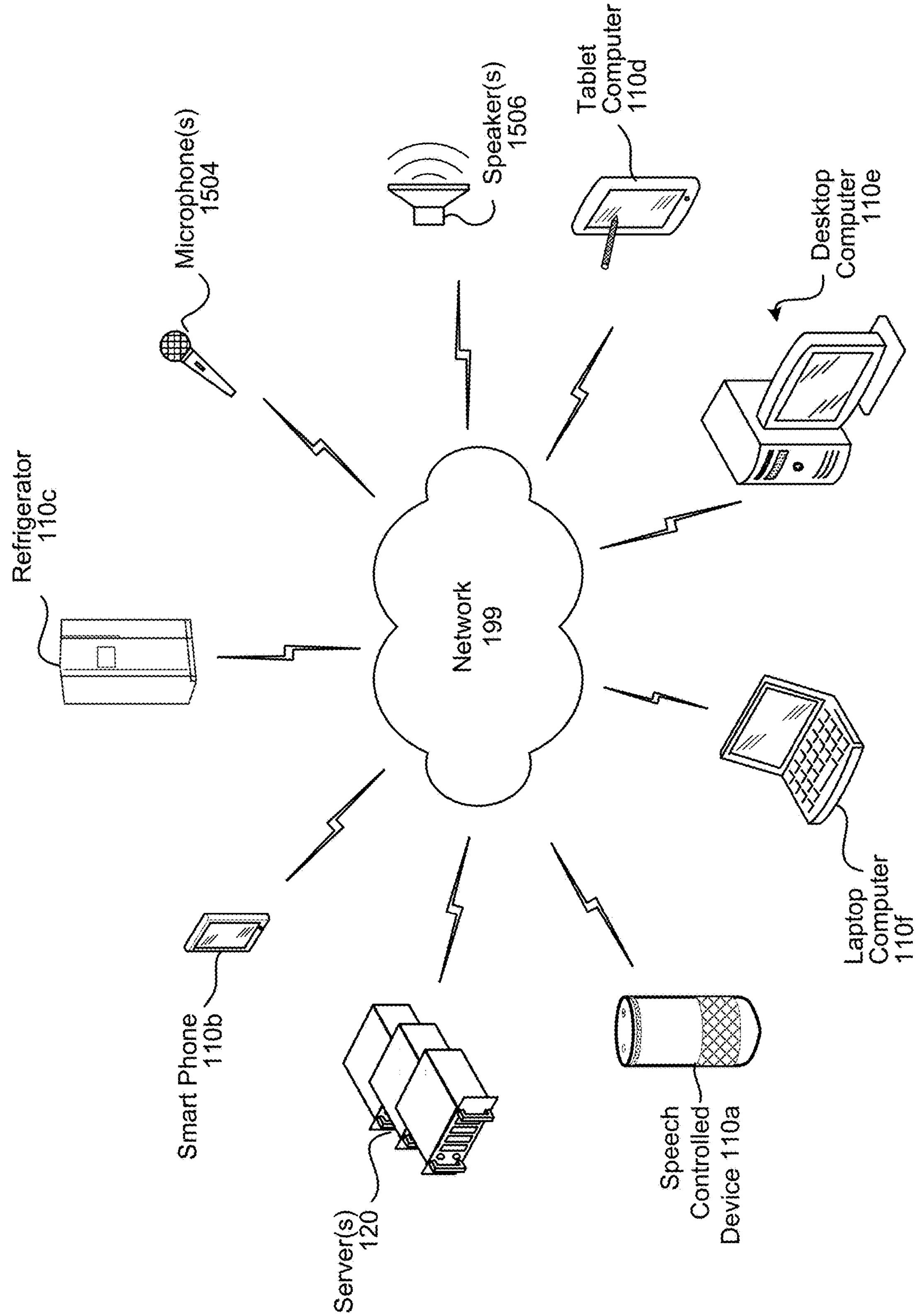
FIG. 15 illustrates a diagram conceptually illustrating distributed computing environment according to embodiments of the present disclosure.

As illustrated in FIG. 15, multiple devices may contain components of the system and the devices may be connected over a network 199. The network 199 is representative of any type of communication network, including data and/or voice network, and may be implemented using wired infrastructure (e.g., cable, CAT5, fiber optic cable, etc.), a wireless infrastructure (e.g., WiFi, RF, cellular, microwave, satellite, Bluetooth, etc.), and/or other connection technologies. Devices may thus be connected to the network 199 through either wired or wireless connections. Network 199 may include a local or private network or may include a wide network such as the internet. For example, server(s) 120, smart phone 110*b*, networked microphone(s) 1504, networked audio output speaker(s) 1506, tablet computer 110*d*, desktop computer 110*e*, laptop computer 110*f*, speech device 110*a*, refrigerator 110*c*, etc. may be connected to the network 199 through a wireless service provider, over a WiFi or cellular network connection or the like.

As described above, a device, may be associated with a user profile. For example, the device may be associated with a user identification (ID) number or other profile information linking the device to a user account. The user account/ID/profile may be used by the system to perform speech controlled commands (for example commands discussed above). The user account/ID/profile may be associated with particular model(s) or other information used to identify received audio, classify received audio (for example as a specific sound described above), determine user intent, determine user purchase history, content accessed by or relevant to the user, etc. The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the components, components and engines may be implemented as in firmware or hardware, including digital filters (e.g., filters configured as firmware to a digital signal processor (DSP)).

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the components and engines may be implemented as in firmware or hardware.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:

receiving input audio data representing an utterance;

processing the input audio data using a first component to determine first acoustic-feature data corresponding to a speaker of the utterance;

determining first data representing words corresponding to requested synthesized speech;

processing the first data to determine second acoustic-feature data;

processing the first acoustic-feature data and the second acoustic-feature data to determine spectrogram data; and processing the spectrogram data to determine output audio data representing synthesized speech of the words, the synthesized speech corresponding to the speaker.

2. The computer-implemented method of claim 1, further comprising:

processing the input audio data to determine the first data representing the words.

3. The computer-implemented method of claim 1, wherein:

the first component comprises a first encoder; and processing the input audio data to determine the first data comprises processing the input audio data using a second encoder to determine the first data.

4. The computer-implemented method of claim 1, wherein processing the first data and the first acoustic-feature data to determine output audio data comprises using at least one model comprising at least one hidden layer to determine the output audio data.

5. The computer-implemented method of claim 1, further comprising:

processing the spectrogram data with a first model to determine model output data; and processing the model output data and the spectrogram data using a second model to determine output data, wherein the output data is used to determine the output audio data.

6. The computer-implemented method of claim 1, further comprising:

processing the input audio data to determine a request to create synthesized speech.

7. The computer-implemented method of claim 1, further comprising:

processing the input audio data to determine third acoustic-feature data corresponding to at least one emotion represented in the utterance, wherein determining the spectrogram data is based at least in part upon processing of the third acoustic-feature data.

8. A system comprising:

at least one processor; and at least one memory comprising instructions that, when executed by the at least one processor, cause the system to:

receive input audio data representing an utterance;

process the input audio data using a first component to determine first acoustic-feature data corresponding to a profession of a speaker of the utterance;

determine first data representing words corresponding to requested synthesized speech;

process the first data to determine second acoustic-feature data;

process the first acoustic-feature data and the second acoustic-feature data to determine spectrogram data; and process the spectrogram data to determine output audio data representing synthesized speech of the words, the synthesized speech corresponding to the profession.

9. The system of claim 8, wherein the at least one memory further comprises instructions that, when executed by the at least one processor, further cause the system to:

process the input audio data to determine the first data representing the words.

10. The system of claim 8 wherein:

the first component comprises a first encoder; and the instructions that cause the system to process the input audio data to determine the first data comprise instructions that, when executed by the at least one processor, further cause the system to process the input audio data using a second encoder to determine the first data.

11. The system of claim 8, wherein the instructions that cause the system to process the input audio data to process the first data and the first acoustic-feature data to determine output audio data comprise instructions that, when executed by the at least one processor, cause the system to use at least one model comprising at least one hidden layer to determine the output audio data.

12. The system of claim 8, wherein the at least one memory further comprises instructions that, when executed by the at least one processor, further cause the system to:

process the spectrogram data with a first model to determine model output data; and process the model output data and the spectrogram data using a second model to determine output data, wherein the output data is used to determine the output audio data.

13. The system of claim 8, wherein the at least one memory further comprises instructions that, when executed by the at least one processor, further cause the system to:

process the input audio data to determine a request to create synthesized speech.

14. The system of claim 8, wherein the at least one memory further comprises instructions that, when executed by the at least one processor, further cause the system to:

process the input audio data to determine third acoustic-feature data corresponding to at least one emotion represented in the utterance, wherein the instructions that cause the system to determine the spectrogram data are based at least in part upon processing of the third acoustic-feature data.

15. A computer-implemented method comprising:

receiving input audio data representing an utterance;

processing the input audio data using a first component to determine first acoustic-feature data corresponding to an age of a speaker of the utterance;

determining first data representing words corresponding to requested synthesized speech;

processing the first data to determine second acoustic-feature data;

processing the first acoustic-feature data and the second acoustic-feature data to determine spectrogram data; and processing the spectrogram data to determine output audio data representing synthesized speech of the words, the synthesized speech corresponding to the age.

16. The computer-implemented method of claim 15, further comprising:

processing the input audio data to determine the first data representing the words.

17. The computer-implemented method of claim 15, wherein:

the first component comprises a first encoder; and processing the input audio data to determine the first data comprises processing the input audio data using a second encoder to determine the first data.

18. The computer-implemented method of claim 15, wherein processing the first data and the first acoustic-feature data to determine output audio data comprises using at least one model comprising at least one hidden layer to determine the output audio data.

19. The computer-implemented method of claim 15, further comprising:

processing the spectrogram data with a first model to determine model output data; and processing the model output data and the spectrogram data using a second model to determine output data, wherein the output data is used to determine the output audio data.

20. The computer-implemented method of claim 15, wherein:

the first data corresponds to a first time resolution; and the first acoustic-feature data corresponds to a second time resolution different from the first time resolution.

* * * * *